United States Patent
Poulin et al.

(10) Patent No.: US 12,149,291 B2
(45) Date of Patent: Nov. 19, 2024

(54) COHERENT RECEIVER HAVING LOW VOA-INDUCED PHASE CHANGES

(71) Applicant: Ciena Corporation, Hanover, MD (US)

(72) Inventors: Michel Poulin, Québec (CA); Antoine Bois, Québec (CA); Tom Luk, Ottawa (CA); François Pelletier, Québec (CA); Sean Sebastian O'Keefe, Dunrobin (CA)

(73) Assignee: Ciena Corporation, Hanover, MD (US)

( * ) Notice: Subject to any disclaimer, the term of this patent is extended or adjusted under 35 U.S.C. 154(b) by 412 days.

(21) Appl. No.: 17/696,948

(22) Filed: Mar. 17, 2022

(65) Prior Publication Data

US 2023/0299855 A1 Sep. 21, 2023

(51) Int. Cl.
*H04B 10/60* (2013.01)
*H04B 10/61* (2013.01)
*H04B 10/07* (2013.01)
*H04B 10/079* (2013.01)

(52) U.S. Cl.
CPC ..... *H04B 10/6164* (2013.01); *H04B 10/6163* (2013.01); *H04B 10/6165* (2013.01); *H04B 10/65* (2020.05); *H04B 10/07* (2013.01); *H04B 10/079* (2013.01); *H04B 10/07955* (2013.01); *H04B 10/60* (2013.01); *H04B 10/61* (2013.01); *H04B 10/615* (2013.01)

(58) Field of Classification Search
CPC ............ H04B 10/6164; H04B 10/6163; H04B 10/6165; H04B 10/65; H04B 10/61; H04B 10/07; H04B 10/079; H04B 10/07955; H04B 10/60; H04B 10/615
USPC ................................................ 398/202–214
See application file for complete search history.

(56) References Cited

U.S. PATENT DOCUMENTS

| 6,519,302 | B1 | 2/2003 | Bruce et al. |
| 6,842,567 | B2 | 1/2005 | Lachance et al. |
| 6,871,304 | B2 | 3/2005 | Hadjihassan et al. |
| 6,980,140 | B1 | 12/2005 | Rowland et al. |
| 7,352,931 | B1 | 4/2008 | Painchaud et al. |

(Continued)

FOREIGN PATENT DOCUMENTS

| EP | 3750240 A1 | 12/2020 |
| WO | 2010009533 A1 | 1/2010 |
| WO | 2021113137 A1 | 6/2021 |

OTHER PUBLICATIONS

Jun. 23, 2023, International Search Report and Written Opinion for International Application No. PCT/US2023/015142.

*Primary Examiner* — Dibson J Sanchez
(74) *Attorney, Agent, or Firm* — Baratta Law PLLC; Lawrence A. Baratta, Jr.

(57) ABSTRACT

A coherent receiver includes a receive signal path including i) an input configured to connect a receive signal, ii) one or more signal paths connected to the input and to one or more optical hybrids, and iii) a variable optical attenuator (VOA) in each of the one or more signal paths; and a local oscillator (LO) signal path including i) an input configured to connect to an LO and the one or more optical hybrids, and ii) one or more complementary VOAs located between the input and the one or more optical hybrids, wherein the one or more complementary VOAs are configured to cancel any phase changes from the VOA in each of the one or more signal paths. The VOA in each of the one or more signal paths and the one or more complementary VOAs can be p-i-n junctions.

20 Claims, 15 Drawing Sheets

(56) References Cited

U.S. PATENT DOCUMENTS

| | | | |
|---|---|---|---|
| 7,711,224 B1 | 5/2010 | Pelletier et al. | |
| 7,936,999 B1 * | 5/2011 | Hawryluck | H04L 7/0075 398/208 |
| 7,940,822 B1 | 5/2011 | Cao et al. | |
| 8,095,615 B2 | 1/2012 | Briscoe et al. | |
| 8,126,332 B2 | 2/2012 | Bainbridge et al. | |
| 8,249,464 B2 * | 8/2012 | Oda | H04B 10/60 398/208 |
| 8,306,419 B2 | 11/2012 | Luk et al. | |
| 8,306,422 B2 | 11/2012 | Bainbridge et al. | |
| 8,406,621 B2 | 3/2013 | Painchaud et al. | |
| 8,538,277 B2 * | 9/2013 | Nagarajan | G02B 6/12009 398/203 |
| 8,767,778 B2 | 7/2014 | Briscoe et al. | |
| 9,477,036 B2 | 10/2016 | Pelletier | |
| 9,625,662 B2 | 4/2017 | Luk et al. | |
| 9,647,753 B1 * | 5/2017 | Kurisu | H04J 14/0221 |
| 9,823,419 B1 | 11/2017 | Pelletier et al. | |
| 9,851,521 B2 | 12/2017 | Pelletier et al. | |
| 9,941,973 B2 | 4/2018 | Simard et al. | |
| 10,020,879 B2 * | 7/2018 | Saito | H04B 10/616 |
| 10,197,821 B2 | 2/2019 | Poulin et al. | |
| 10,663,663 B2 | 5/2020 | Painchaud et al. | |
| 10,715,169 B1 | 7/2020 | Aouini et al. | |
| 10,763,968 B1 * | 9/2020 | Li | H04B 10/40 |
| 10,830,638 B2 | 11/2020 | Pelletier et al. | |
| 11,099,065 B2 | 8/2021 | Luk et al. | |
| 11,227,790 B1 | 1/2022 | Filion et al. | |
| 11,489,590 B1 * | 11/2022 | Leykauf | H04B 10/615 |
| 2003/0185258 A1 | 10/2003 | Dyer et al. | |
| 2004/0008413 A1 | 1/2004 | Trepanier et al. | |
| 2008/0273876 A1 * | 11/2008 | Lundquist | H04B 10/296 398/59 |
| 2010/0129077 A1 | 5/2010 | Bainbridge et al. | |
| 2010/0178065 A1 | 7/2010 | Nishihara et al. | |
| 2011/0129213 A1 | 6/2011 | Painchaud et al. | |
| 2012/0063474 A1 | 3/2012 | Ayotte et al. | |
| 2013/0188918 A1 | 7/2013 | Painchaud et al. | |
| 2013/0236172 A1 * | 9/2013 | Suzuki | H04B 10/615 398/43 |
| 2013/0322876 A1 * | 12/2013 | Gehrke | H04B 10/07955 398/205 |
| 2013/0343751 A1 * | 12/2013 | Mamyshev | H04B 10/615 398/202 |
| 2014/0348515 A1 * | 11/2014 | Tsubouchi | H04B 10/614 398/202 |
| 2015/0139667 A1 | 5/2015 | Takeuchi et al. | |
| 2016/0248521 A1 * | 8/2016 | Streshinsky | G02F 1/313 |
| 2017/0134097 A1 * | 5/2017 | Morie | H04B 10/61 |
| 2017/0192173 A1 * | 7/2017 | Evans | H04B 10/615 |
| 2020/0014354 A1 | 1/2020 | Luk et al. | |
| 2020/0064707 A1 | 2/2020 | Vitic et al. | |
| 2020/0295825 A1 * | 9/2020 | Sugiyama | H04B 10/40 |
| 2020/0355980 A1 * | 11/2020 | Celo | G02F 1/31 |
| 2020/0363665 A1 | 11/2020 | Latrasse et al. | |
| 2021/0124234 A1 | 4/2021 | Vitic et al. | |
| 2021/0266066 A1 | 8/2021 | Bois et al. | |
| 2021/0336695 A1 * | 10/2021 | Yoffe | H04B 10/073 |
| 2021/0359763 A1 | 11/2021 | Cai et al. | |
| 2022/0065743 A1 | 3/2022 | Simard et al. | |

* cited by examiner

COHERENT RECEIVER HAVING LOW VOA-INDUCED PHASE CHANGES

FIELD OF THE DISCLOSURE

The present disclosure generally relates to components for optical networking. More particularly, the present disclosure relates to systems and methods for a coherent receiver having low variable optical attenuator (VOA)-induced phase changes.

BACKGROUND OF THE DISCLOSURE

An intradyne coherent receiver (ICR) provides advanced demodulation to analyze, on two orthogonal polarization states respectively, the amplitude and optical phase of an amplitude- and phase-modulated signal (SIG) relative to a local oscillator (LO) optical reference. It is generally desired to be able to attenuate the SIG-LO beat signal. This is usually done by adding a variable optical attenuator in the signal path (i.e., the path carrying the modulated optical signal). A single VOA added in the ICR to attenuate the SIG-LO beat signal can lead to phase change of the beat signal which can be problematic. A short p-i-n junction VOA, providing attenuation of light through carrier injection, i.e., a CI-VOA, will change the phase of an incoming signal (i.e., introduce chirp) in addition to providing attenuation. Another existing approach includes using a Mach Zehnder interferometer (MZI) with a phase changing element in each arm (i.e., one each for the X and Y channels). By changing the relative phase difference between the arms of the MZI, one can produce a variable attenuator. A CI-VOA, placed in each arm, can produce just enough phase shift (at least $\pi$) without causing too much intrinsic absorption. Disadvantageously, there remains also a phase shift (of $\pi/2$) due to the nature of the MZI transfer function. This causes problems with a beat signal in the coherent receiver. It would be advantageous to use thermal phase shifters (TPS) as opposed to current injection phase shifters, but the former are too slow for applications requiring high-speed ICRs such as high-speed optical communications.

There is a need to integrate fast VOA functionality in coherent receivers while compensating for any VOA-induced phase changes in order to not impact system performance.

BRIEF SUMMARY OF THE DISCLOSURE

Variously, the present disclosure relates to systems and methods for a coherent receiver having low VOA-induced phase changes. In an embodiment, the present disclosure relates to systems and methods for a coherent receiver configured to cancel VOA-induced phase changes. To cancel VOA-induced phase changes in the signal (SIG), we introduce a complementary VOA in the LO path, for the particular purpose of avoiding a phase change in the beat signal. This approach provides a simplified compensation scheme, eliminating any need for circuit-based compensation schemes. In another embodiment, the present disclosure includes a high-speed VOA that minimizes optical phase excursion during its operation while having minimal insertion loss in the fully open setting. This includes a MZI architecture with the combination of low- and high-speed phase shifters for the purpose of realizing a variable optical attenuator with low phase excursion and low insertion at the fully 'bright' setting.

In an embodiment, a coherent receiver includes a receive signal (SIG) path including i) an input configured to connect a receive signal, ii) one or more signal paths connected to the input and to one or more optical hybrids, and iii) at least one variable optical attenuator (VOA); a local oscillator (LO) signal path including an input configured to connect to an LO and the one or more optical hybrids; and a VOA-induced phase change compensation mechanism that reduces any VOA-induced phase change in a SIG-LO beat signal due to the at least one VOA.

The VOA-induced phase change compensation mechanism can include at least one tandem VOA in the LO path. The at least one VOA and the at least one tandem VOA can each be a same type of VOA. The at least one VOA and the at least one tandem VOA can each be a different type of VOA. The at least one VOA and the at least one tandem VOA can each be any of a current injection VOA (CI-VOA) and a chirped Mach-Zehnder (MZ) interferometer (MZI) VOA (MZI-VOA). The at least one VOA and the at least one tandem VOA can each be controlled with a same control signal. The at least one VOA and the at least one tandem VOA can each be controlled with independent control signals. The at least one VOA and the at least one tandem VOA cam each include different phase versus attenuation characteristics, which are configured appropriately. The at least one VOA and the at least one tandem VOA can each have their attenuation set based to provide a same amplitude of a corresponding beat signal.

The one or more signal paths can include two signal paths, one for an X-polarization and one for a Y-polarization, wherein the VOA in each of the one or more signal paths include a VOA(X) and a VOA(Y). The VOA-induced phase change compensation mechanism can include at least one tandem VOA in the LO path. The at least one tandem VOA can include two VOAs including a LO VOA(X) and a LO VOA(Y) in the LO signal path.

The VOA-induced phase change compensation mechanism can include the at least one VOA being a chirp-free Mach-Zehnder (MZ) interferometer. The chirp-free Mach-Zehnder (MZ) interferometer can include a p-i-n junction phase shifter for fast phase control, and a thermal phase shifter (TPS) for slow phase control.

The VOA-induced phase change compensation mechanism can reduce the VOA-induced phase change to within tens of thousands or less of $$\frac{\text{rad}_{RMS}}{\text{sec}} \text{ and } \frac{\text{rad}_{Peak}}{\text{sec}}.$$

In another embodiment, a coherent receiver is formed by a process including steps of forming a receive signal (SIG) path including i) an input configured to connect a receive signal, ii) one or more signal paths connected to the input and to one or more optical hybrids, and iii) at least one variable optical attenuator (VOA); forming a local oscillator (LO) signal path including an input configured to connect to an LO and the one or more optical hybrids; and providing a VOA-induced phase change compensation mechanism that reduces any VOA-induced phase change in a SIG-LO beat signal due to the at least one VOA. The VOA-induced phase change compensation mechanism can include at least one tandem VOA in the LO path. The VOA-induced phase change compensation mechanism can include the at least one VOA being a chirp-free Mach-Zehnder (MZ) interferometer.

In a further embodiment, a method includes steps of receiving a receive signal at an input of a receive signal path having one or more signal paths, attenuating the receive signal via at least one variable optical attenuator (VOA), and providing the attenuated receive signals to one or more optical hybrids; receiving a local oscillator (LO) signal, and providing the attenuated LO signal to the one or more optical hybrids; and compensating any VOA-induced phase change in a SIG-LO beat signal due to the at least one VOA. The VOA-induced phase change compensation mechanism can reduce the VOA-induced phase change to within tens of thousands or less of $$\frac{\text{rad}_{RMS}}{\text{sec}} \text{ and } \frac{\text{rad}_{Peak}}{\text{sec}}.$$

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION OF THE DISCLOSURE

Again, variously, the present disclosure relates to systems and methods for a coherent receiver having low VOA-induced phase changes. In an embodiment, the present disclosure relates to systems and methods for a coherent receiver configured to cancel VOA-induced phase changes. To cancel VOA-induced phase changes in the signal (SIG) path, we introduce a complementary VOA in the LO path, for the particular purpose of avoiding a phase change in the beat signal. This approach provides a simplified compensation scheme, eliminating any need for circuit-based compensation schemes. In another embodiment, the present disclosure includes a high-speed VOA that minimizes optical phase excursion during its operation while having minimal insertion loss in the fully open setting. This includes a MZ architecture with the combination of low- and high-speed phase shifters for the purpose of realizing a variable optical attenuator with low phase excursion and low insertion at the fully 'bright' setting.

Coherent Receiver

Figure 1:
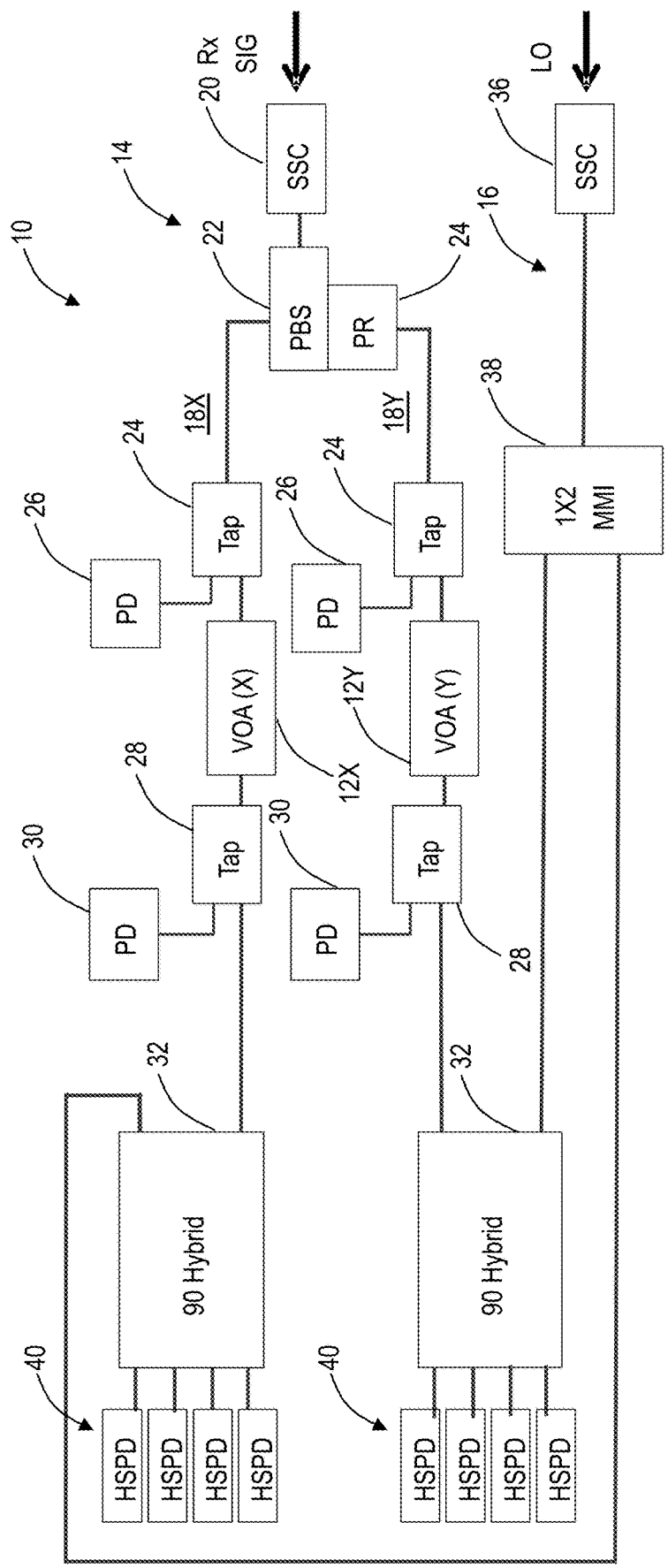
FIG. 1 is a block diagram of a coherent optical receiver 10 with internal VOAs on the X and Y receive signal path.

FIG. 1 is a block diagram of a coherent optical receiver 10 with internal VOAs 12X, 12Y on the X and Y receive signal path. The coherent optical receiver 10 can be referred to as an ultra-high bandwidth (UHB) ICR. The coherent optical receiver 10 includes a receive signal (SIG) path 14 and a LO signal path 16. The receive signal path 14 includes an X-polarization signal path 18X and a Y-polarization signal path 18Y.

In an embodiment, the receive signal path 14 includes a spot size converter (SSC) 20 for optical coupling of the light from the receive (Rx) signal (SIG input) into the photonic chip. Next, there is a polarizing beam splitter (PBS) 22 to split the X- and Y-polarizations to the respective signal paths 18X, 18Y, and a polarization rotator (PR) 24 on the signal path 18Y, which is only required if the polarization needs to be rotated. Next, each of the signal paths 18X, 18Y have similar components, including a tap coupler 24 connected to a photodetector 26 and the VOAs 18X, 18Y. Subsequent to the VOAs 12X, 12Y, there is another tap 28 that connects to a photodetector 30 and to a 90-degree optical hybrid 32 (of note, as described herein the term "optical hybrid" refers to a 90-degree optical hybrid). Note, the photodetectors 26, 30 are used to monitor the VOAs 12X, 12Y for control thereof. The photodetectors 26, 30 are optional.

The optical hybrid 32 also includes an input from the LO signal path 16. The LO signal path 16 includes an SSC 36 connected to the LO input and to a multimode interferometer (MMI) configured as a 1×2 splitter 38 which provides the LO signal to the optical hybrids 32 for coherent detection of the Rx signal. Each of the optical hybrid 32 outputs is connected to balanced pairs of high-speed photodetectors (HSPD) 40, namely one pair each for the in-phase (I) and quadrature (Q) signals for each of the X- and Y-polarizations, i.e., XI, XQ, YI, YQ.

Of note, there are VOAs 12X, 12Y in the receive signal path 14, but not in the LO signal path 16, thereby causing a phase difference between these two paths 14, 16 when the VOA attenuation is changed. Also, the components in FIG. 1 are an example embodiment, and those skilled in the art will recognize there can be different components. The key aspect in FIG. 1 is the fact the VOAs 12X, 12Y cause the phase difference between these two paths 14, 16 to change when VOA attenuation is varied. This is detrimental in the application and depends on the amplitude and speed of the phase variation induced by the VOA.

VOAs

FIGS. 2A-2D are graphs of characteristics of a typical VOA using a p-i-n junction in carrier injection mode (forward voltage operation). These can be referred to herein as current-injection VOAs (CI-VOA). The VOAs provide attenuation of light through carrier injection when the junction is forward biased. The intrinsic region is located at the center of the waveguide where light is travelling. However, the presence of injected carriers in the waveguide also has the consequence of changing the refractive index (as implied from Soref's equations, see Soref et al., "Electrooptical effects in silicon." *IEEE J. Quantum Electron.*, 23.1 (1987): 123-129, referred to herein as Soref et al.). Following the relation shown in FIG. 2A, a significant phase change close to 10 rads would be obtained for an attenuation of 20 dB.

This phase change induced by the VOA has the undesirable consequence of changing the phase of the SIG-LO beat product as well. This beat signal results from the difference in the photocurrent from each photodiode (i.e., high-speed photodiode (HSPD)) in a given balanced pair, $I_1$-$I_2$. The beat signal can be expressed by the following equation:

$$\Delta I(t) = I_1(t) - I_2(t) = 2R\sqrt{P_s(t)P_{LO}(t)}\sin((\omega_s - \omega_{LO})t + \phi_s(t) - \phi_{LO}(t))$$

Where R is the photodiode responsivity, $P_s$ is the optical power from the SIG port entering the balanced pair of HSPD (high-speed photodiodes), $P_{LO}$ is the optical power from the Local Oscillator (LO) port, $\omega_s$ and $\omega_{LO}$ are respectively the optical (angular) frequency of the incoming signal and LO, $\phi_s$ and $\phi_{LO}$ are the phase of these optical signals. Note that these phases include the phase noise on both SIG and LO lasers, the phase modulation on the received signal from the SIG port, and the VOA-induced phase change.

One can see that changing the optical attenuation in the SIG path induces a corresponding phase change in the beat signal, which is amplified by the TIA and directed to the output of the coherent receiver 10. A state-of-the-art ASIC can compensate for such phase variation to a certain extent, depending on the amplitude and speed at which the changes occur. Ideally, no such phase change would be produced when attenuating the optical signal from the SIG port, thereby eliminating any need for compensation.

Coherent Receiver Canceling VOA-Induced Phase Changes

Figure 3:
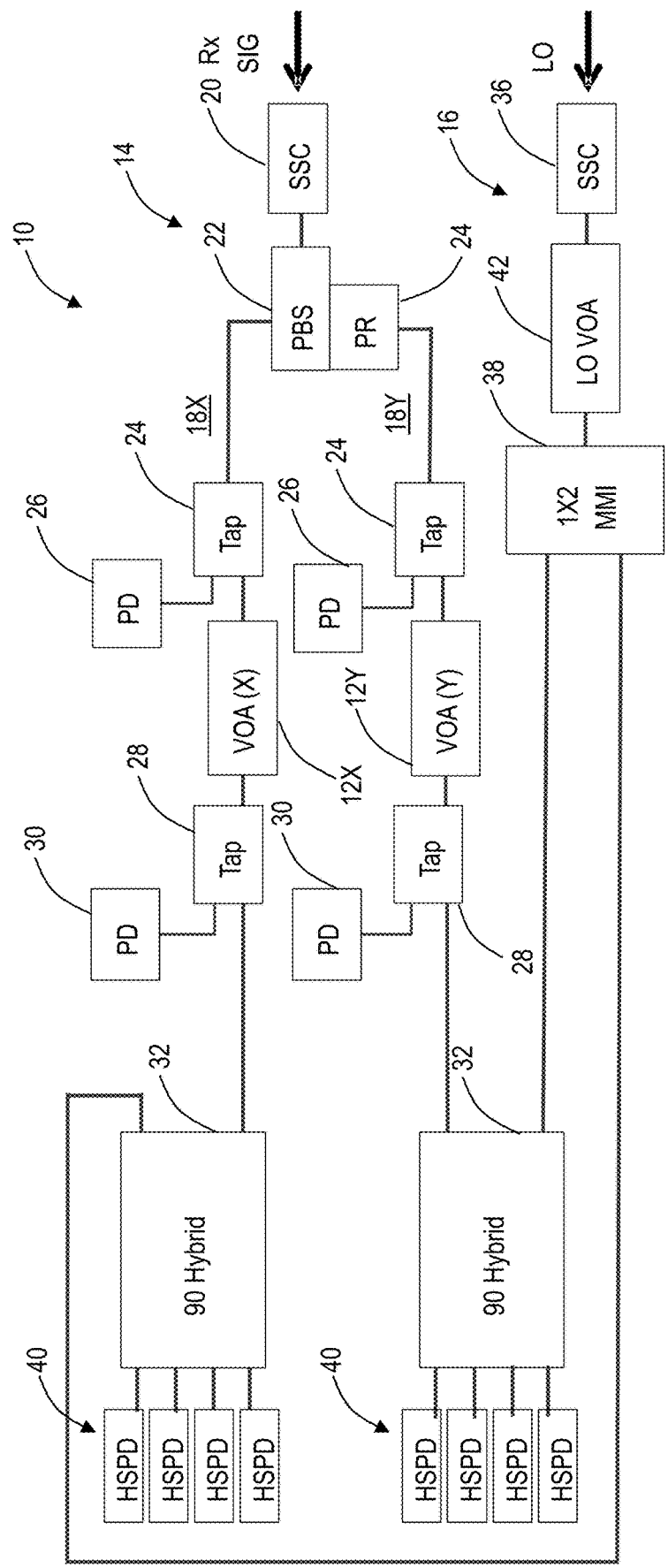
FIG. 3 is a block diagram of a coherent optical receiver with internal VOAs on the X and Y receive signal path and a complementary VOA on the LO signal path.
Figure 4:
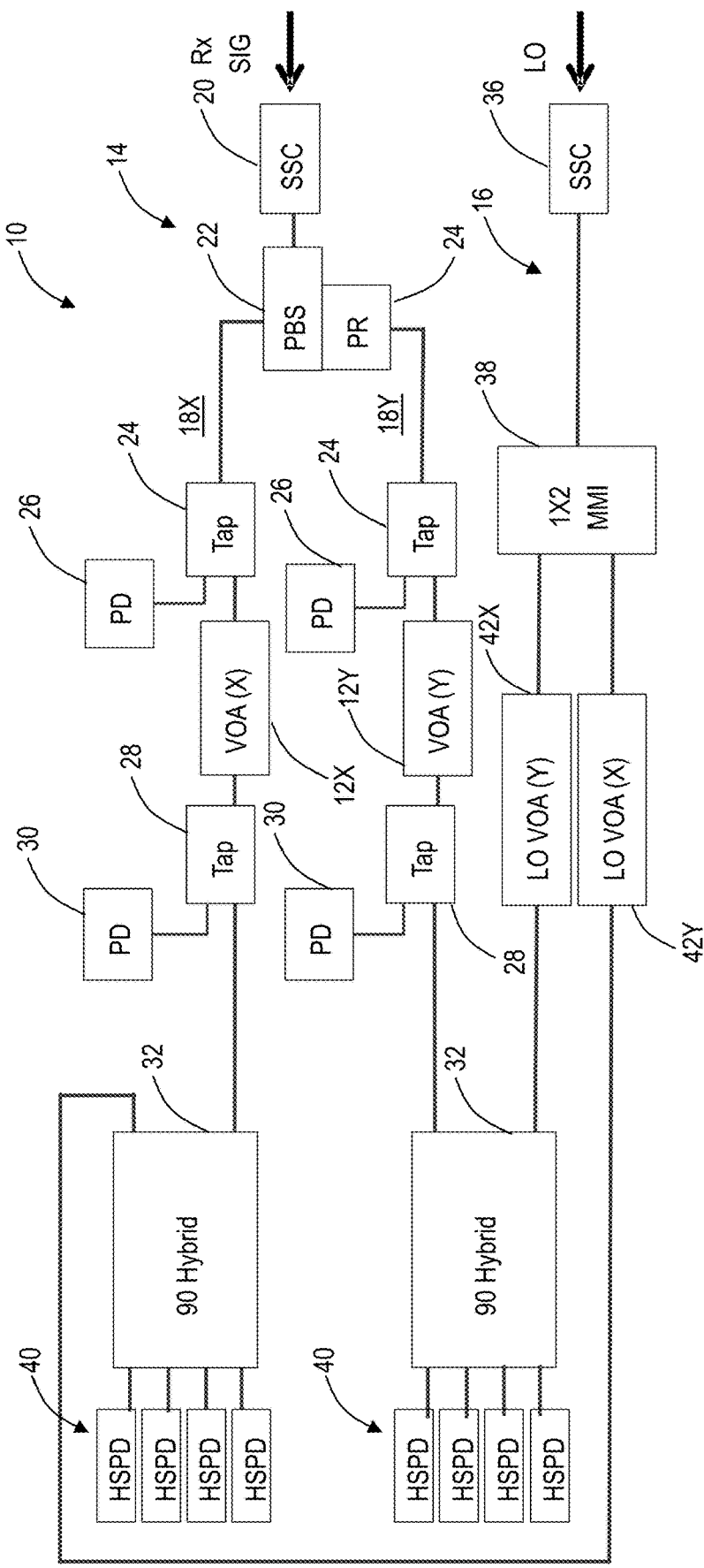
FIG. 4 is a block diagram of a coherent optical receiver with internal VOAs on the X and Y receive signal path and complementary VOAs on the LO signal path after the 1×2 MMI.

The present disclosure proposes to add a VOA 42, 42X, 42Y in the LO signal path 16, identical, substantially similar, or different but configured to be similar to the ones used in the SIG paths, as illustrated in FIGS. 3 and 4, and use both the SIG-VOA and LO-VOA simultaneously to adjust the beat signal amplitude. FIG. 3 is a block diagram of a coherent optical receiver 10 with internal VOAs 12X, 12Y on the X and Y receive signal path 14 and a complementary VOA 42 on the LO signal path 16. FIG. 4 is a block diagram of a coherent optical receiver 10 with internal VOAs 12X, 12Y on the X and Y receive signal path 14 and a complementary VOAs 42X, 42Y on the LO signal path 16 after the 1×2 MMI 36.

Controlling the "LO-VOA" 42 using the same voltage as the one used for the "SIG-VOA" 12 will lead to the same induced phase change in the LO signal path 16 than in the receive signal path 14 (i.e., $\phi_{s,VOA} = \phi_{LO,VOA}$), so that the difference ($\phi_s(t) - \phi_{LO}(t)$) associated with a change in both LO and SIG VOA state will cancel at all time, leaving unaffected the phase of the beat signal.

Of course, by using a LO-VOA 42, the attenuation needs to be adjusted differently to produce the same amplitude of the beat signal, because the latter is proportional to the product of SIG and LO optical powers (see equation above). So, the attenuation provided by both the SIG and LO VOA 12, 42 needs to be divided by 2 (in dB) compared to the case where only the SIG VOA 12 is used.

A disadvantage of using a LO-VOA 42 is the associated excess loss of introducing a VOA in the LO signal path 16—a few tenths of a dB at most typically. This can be partially compensated by the fact that the SIG-VOA 12 can be comparatively shorter (compared to the scheme without a LO-VOA) because the total attenuation is now provided by the two elements. In general, losses on the SIG receive signal path 14 are more critical as it carries the optical signal with information, which must maintain a high signal-to-noise ratio (SNR).

The control signal for the LO-VOA 42 could be the same voltage that is used to control the SIG-VOA 12. For operation of the VOA at high speed, this allows time matching of the control signals for dynamic cancellation of the phase. Or, alternatively, another control scheme would be to connect all VOA in series to ensure that the same current circulates in each of them, so that each would induce exactly the same phase shift. The latter option requires a larger control voltage, however.

It is also possible to send independent signals to every VOA 12, 42. This can ensure that the phase remains fully compensated if the LO-VOA 42 and SIG-VOA 12 were to have slight manufacturing differences and as such, differing "attenuation vs. voltage" or "attenuation vs. current" characteristics (depending on if the VOA are controlled with a voltage or a current source). These independent control signals would take these distinct individual characteristics into account to adjust differently the LO-VOA and the SIG-VOA voltage or current. Independent controls could also be useful to adjust differently the LO-VOA and the SIG-VOA to compensate effects of local temperature difference between the LO-VOA and the SIG-VOA when the ambient (case) temperature is varied.

Using only one VOA 42 in the LO signal path 16 (as in FIG. 3) is somewhat restricting the attenuation on the X and Y channels to be the same. If one wants to keep adjusting the X and Y channel's attenuation independently, one can use two VOAs 42X, 42Y in the LO path, after the X-Y splitter (1×2 MMI 38) in the LO signal path 16, as illustrated in FIG. 4.

VOA Control

Figure 5:
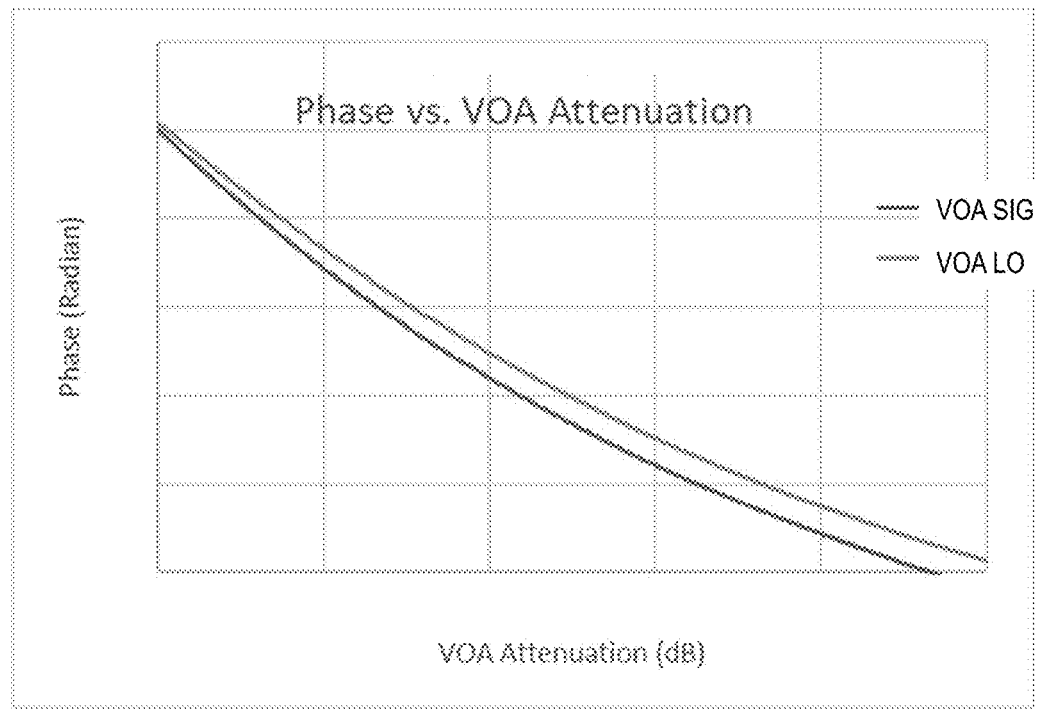
FIG. 5 is a graph of two VOAs with un-matched phase vs. attenuation response.
Figure 6:
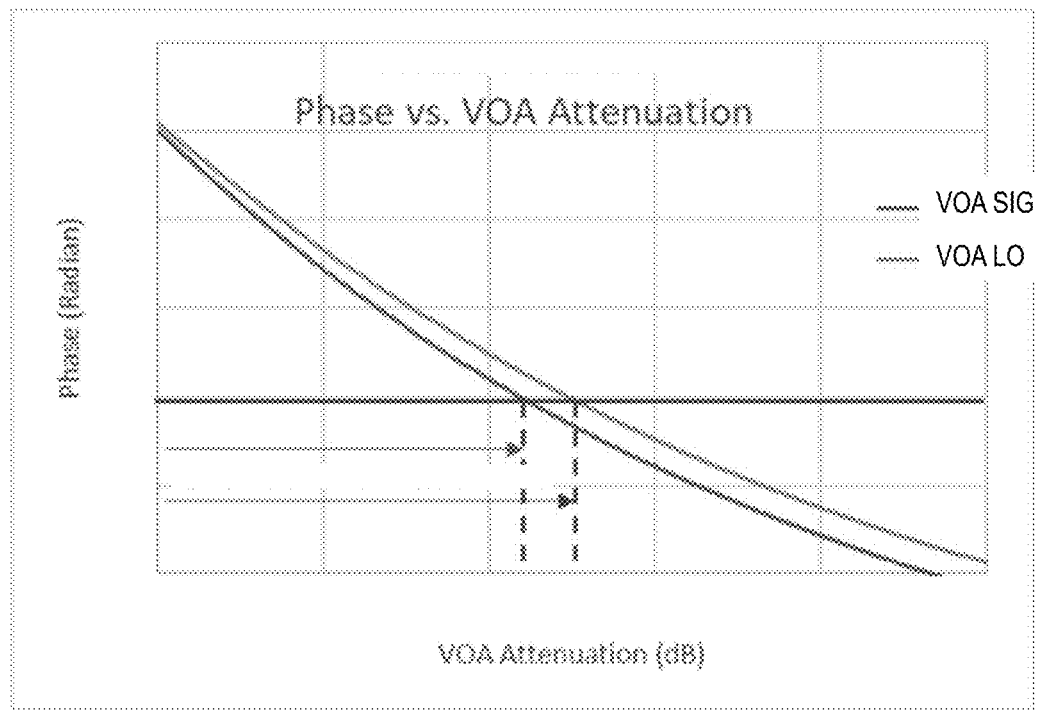
FIG. 6 is a graph of two VOAs where phase could be matched if independent controls and calibrations could be use on the X and Y polarization.
Figure 7:
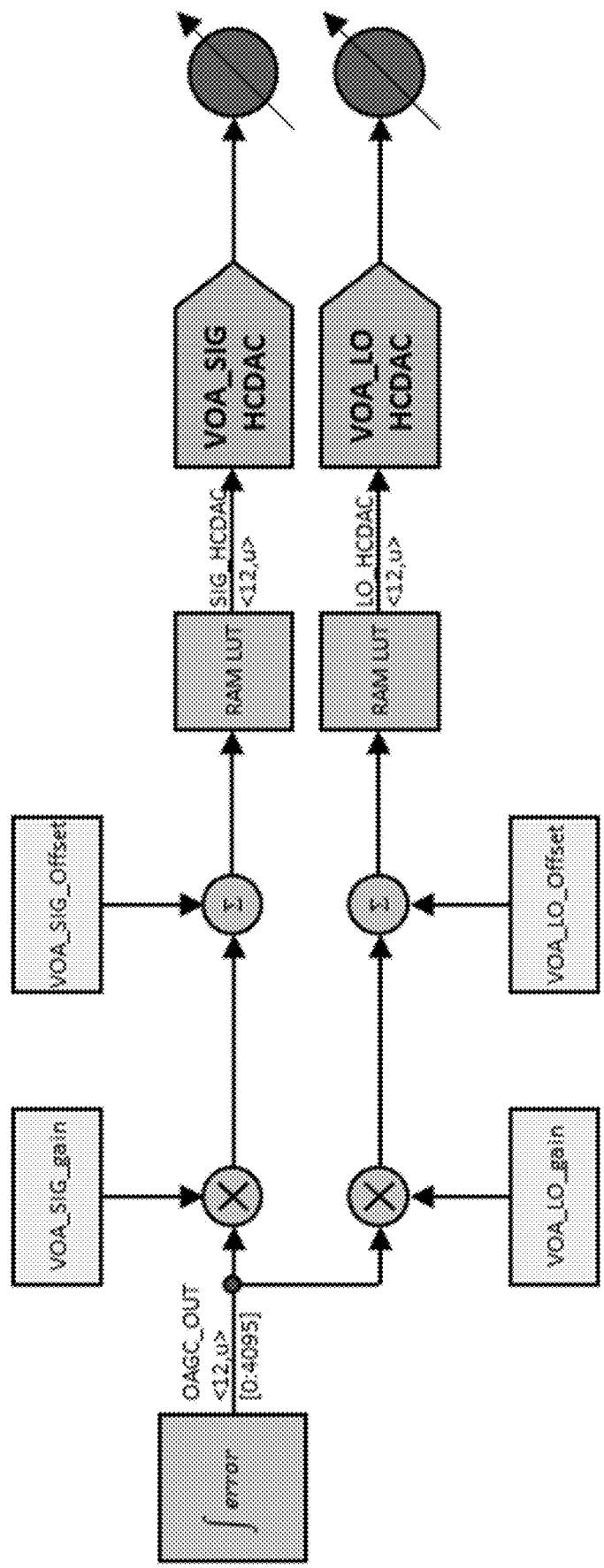
FIG. 7 is a diagram of a process for matching the phase of the two VOAs.

FIG. 5 is a graph of two VOAs 42X, 42Y with un-matched phase vs. attenuation response. FIG. 6 is a graph of two VOAs 42X, 42Y where phase is matched with a single control value. FIG. 7 is a diagram of a process 50 for matching the phase of the two VOAs 42X, 42Y.

As described herein, the VOA 42, 42X, 42Y can be referred to as "tandem" VOAs meaning they are being used in conjunction with the VOAs 12X, 12Y, i.e., the VOAs 12X, 12Y in the SIG path and the VOAs 42, 42X, 42Y in the LO path. That is, tandem refers to operation of the VOAs, working in conjunction with one another.

Control of the tandem VOA attenuation is performed by the digital optical and electrical automatic gain control (AGC) loop. To address the possibility that the two VOAs do not have perfectly matched phase vs. attenuation characteristic as shown in the example of FIG. 5, the digital AGC loop that controls the VOAs can have a "gain and offset" and/or a "Random Access Memory (RAM look-up-table (LUT)" compensation feature to match the phase vs. attenuation response of the two VOAs 42X, 42Y.

In the example of FIG. 7, both VOAs are controlled by a single integrator of the AGC. The AGC output is digital and has a range. The VOA attenuation is set via the High-Current DAC (HCDAC). The functions of the "gain and offset" and/or "RAM LUT" elements are:

(1) The Gain and Offset elements are to map the integrator output OAGC_OUT range such that at a given OAGC value, the two HCDACs would set their respective VOA attenuation so that they result to approximately the same phase as illustrated in FIG. 6. The difference in attenuation setting does not impact the performance of the AGC and the receiver.

(2) If a RAM LUT table is present, it can be programmed to perform the "Gain and Offset" function as described in (1) above; plus, it can also be programmed to linearize the $$\frac{\text{Radian}}{dB}$$

slope to be ~constant. Doing so it also linearizes the Attenuation vs. HCDAC slope $$\frac{dB}{LSB}$$

to be ~constant as well which are desirable for the AGC performance.

Of course, various approaches for controlling the VOAs 42X, 42Y are contemplated, to ensure that the phase of the LO-VOA matches that of the SIG-VOA. The control is advantageous for differing VOA characteristics over one same silicon photonics (SiP) die, as well as for difference in their variations over temperature.

VOA Phase Canceling Process

Figure 8:
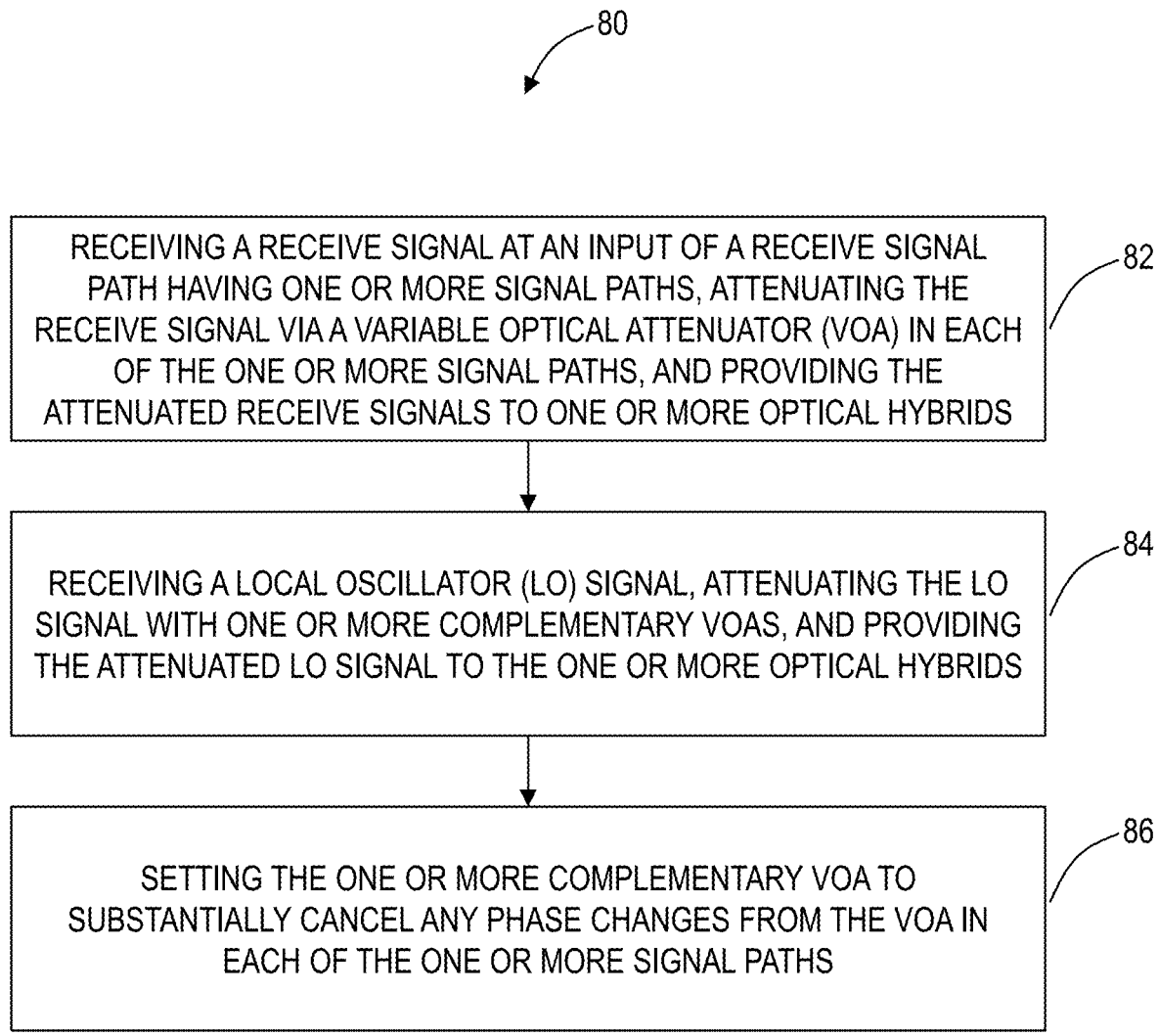
FIG. 8 is a flowchart of a process for VOA-induced phase change cancellation.

FIG. 8 is a flowchart of a process 80 for VOA-induced phase change cancelation. The process 80 can be implemented in the coherent receiver 10 or the like. The process 80 includes receiving a receive signal at an input of a receive signal path having one or more signal paths, attenuating the receive signal via a variable optical attenuator (VOA) in each the one or more signal paths, and providing the attenuated receive signals to one or more optical hybrids (step 82); receiving a local oscillator (LO) signal, attenuating the LO signal with one or more complementary VOAs, and providing the attenuated LO signal to the one or more optical hybrids (step 84); and setting the one or more complementary VOAs to substantially cancel any phase changes from the VOA in each of the one or more signal paths (step 86). Of note, the term "substantially" means the phase change cancelation is set to cancel all or most of the phase change. Those skilled in the art will recognize there may be some minor phase differences, i.e., ($\phi_{s,VOA}(t)-\phi_{LO,VOA}(t)$) may not exactly equal zero. That is, even if the term "substantially" is not used in conjunction with the phase change cancelation, those skilled in the art will understand this means most of the phase change.

The VOA in each of the one or more signal paths and the one or more complementary VOAs can be p-i-n junctions. The VOA in each of the one or more signal paths and the one or more complementary VOAs can each be a same type of VOA. The one or more signal paths can include two signal paths, one for an X-polarization and one for a Y-polarization, and the VOA in each of the one or more signal paths include a VOA(X) and a VOA(Y). The one or more complementary VOAs can include one VOA in the LO signal path. The one or more complementary VOAs can include two VOAs including a LO VOA(X) and a LO VOA(Y) in the LO signal path.

The process 80 can further include controlling the VOA in each of the one or more signal paths and the one or more complementary VOAs with a same control signal. The process 80 can further include controlling the VOA in each of the one or more signal paths and the one or more complementary VOAs with independent control signals. The process 80 can further include compensating for different phase versus attenuation characteristics between any of the VOA in each of the one or more signal paths and the one or more complementary VOAs. The process 80 can further include setting attenuation or VOA in each of the one or more signal paths and the one or more complementary VOAs to provide a same amplitude of a corresponding beat signal.

Coherent Receiver with Complementary VOAs

In an embodiment, a coherent receiver includes a receive signal path including i) an input configured to connect a receive signal, ii) one or more signal paths connected to the input and to one or more optical hybrids, and iii) a variable optical attenuator (VOA) in each of the one or more signal paths; and a local oscillator (LO) signal path including i) an input configured to connect to an LO and the one or more optical hybrids, and ii) one or more complementary VOAs located between the input and the one or more optical hybrids, wherein the one or more complementary VOAs are configured to substantially cancel any phase changes from the VOA in each of the one or more signal paths.

The VOA in each of the one or more signal paths and the one or more complementary VOAs can be p-i-n junctions, namely all being the CI-VOAs described herein. The VOA in each of the one or more signal paths and the one or more complementary VOAs can each be a same type of VOA. The same type can be a CI-VOA, a chirped MZ-VOA, and the like. The chirped MZ VOA is single end drive on either upper or lower MZ arm 14, 16. In another embodiment, the VOA in each of the one or more signal paths and the one or more complementary VOAs can each be a different type of VOA. Again, the different type can be any of CI-VOA, chirped MZ VOA, and the like.

The one or more signal paths can include two signal paths, one for an X-polarization and one for a Y-polarization, wherein the VOA in each of the one or more signal paths include a VOA(X) and a VOA(Y). The one or more complementary VOAs can include one VOA in the LO signal path.

The one or more complementary VOAs can include two VOAs including a LO VOA(X) and a LO VOA(Y) in the LO signal path.

The VOA in each of the one or more signal paths and the one or more complementary VOAs can each be controlled with a same control signal. The VOA in each of the one or more signal paths and the one or more complementary VOAs can each be controlled with independent control signals.

The VOA in each of the one or more signal paths and the one or more complementary VOAs can each include different phase versus attenuation characteristics, which is compensated therefore. The VOA in each of the one or more signal paths and the one or more complementary VOAs can each have their attenuation set based to provide a same amplitude of a corresponding beat signal.

Mach-Zehnder Interferometer Architectures for High-Speed, Low Phase-Change and Low Insertion Loss VOAs The VOAs 12, 42 can include p-i-n junctions operated in forward bias. A MZ architecture by itself can provide a VOA (or rather, a switch with a continuous control signal where only one port is used) in platforms lacking the necessary dopants, without necessarily any consideration for phase, see, e.g., Alireza Tabatabaei Mashayekh, et al., "Silicon nitride PIC-based multi-color laser engines for life science applications," Opt. Express 29, 8635-8653 (2021), the contents of which are incorporated by reference.

Also, as described herein, a standard VOA induces a certain amount of phase shift for a given attenuation, which will exceed the phase shift that can be compensated if the device remains compact. The MZI VOA using p-i-n junctions are inherently lossy at their bright state due to the fabrication uncertainty that forces the usage of the p-i-n junction to shift the MZI operating point at its fully open position.

In an embodiment, the present disclosure includes a high-speed VOA that minimizes optical phase excursion during its operation while having minimal insertion loss in the fully open setting. A Mach-Zehnder interferometer architecture incorporating both low- and high-speed phase shifters is used to produce high attenuation while limiting the phase excursion. We describe the implementation of the phase shifters for limiting insertion loss (IL), control loop complexity, and maximizing compactness.

A low-phase change VOA is useful for coherent receivers. Demodulation involves comparing the time-varying amplitude and/or phase of an incoming signal (SIG) to a phase stabilized continuous wave (CW) laser (local oscillator—LO). During high-speed operation of a VOA (e.g., for compensation of fast amplitude perturbations from a fiber link), any additional phase imparted by the VOA can introduce errors in the demodulation. While a state-of-the-art ASIC can compensate such phase variations to a limited extent, it remains useful and, in some cases, necessary to reduce phase excursions as much as possible.

Figure 9:
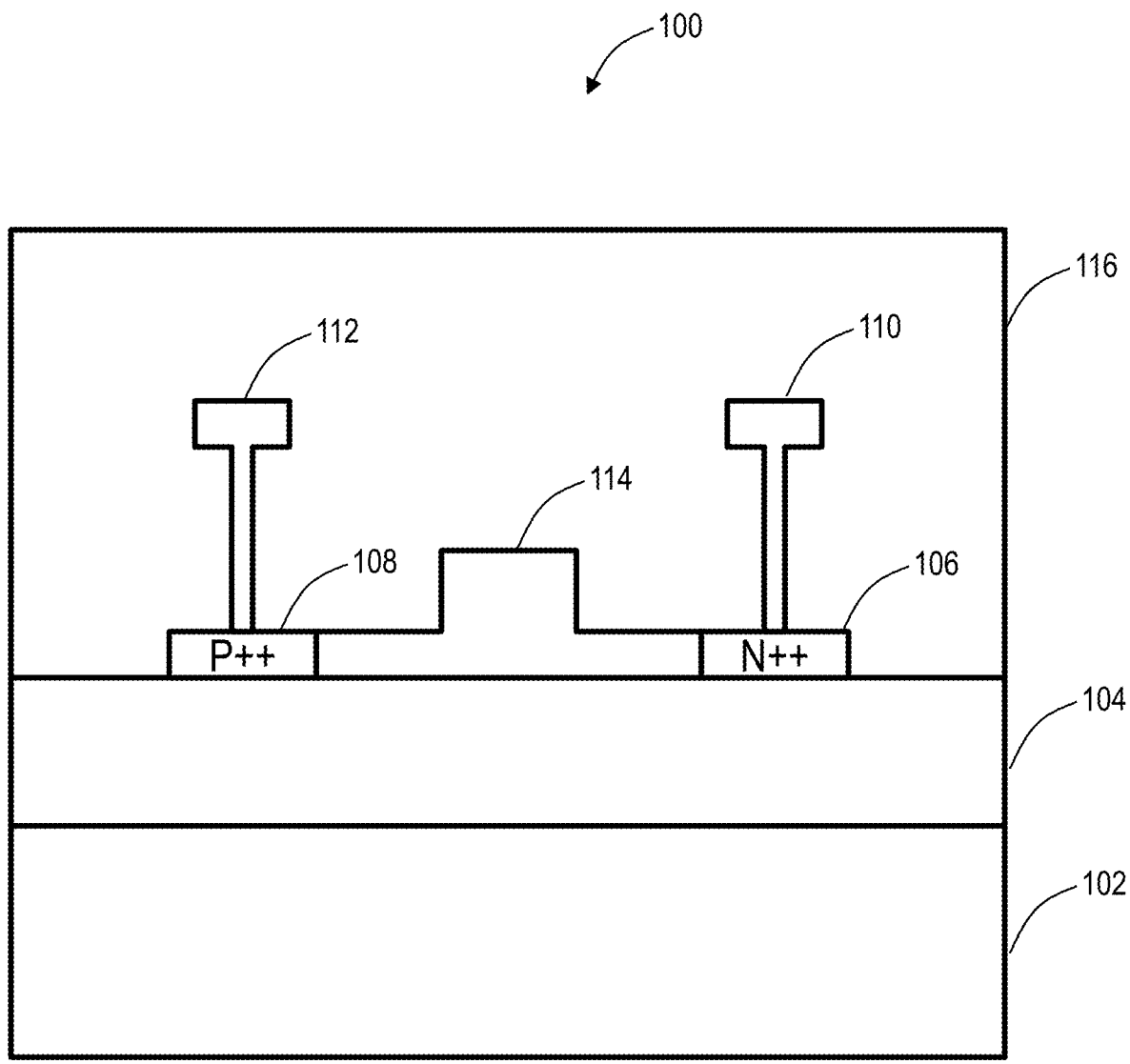
FIG. 9 is a diagram of a VOA in a silicon photonics platform.

FIG. 9 is a diagram of a VOA in a silicon photonics platform 100. The silicon photonics platform 100 includes a substrate 102, a buried oxide (BOX) layer 104, doped sections 106, 108 connected to metal contacts 110, 112, respectively, a waveguide core 114, and a top oxide cladding 116. Fast (such as on the order of 10-100 MHz) VOAs in silicon photonics platforms 100 operate most commonly on the basis of a p-i-n junction in forward bias. The attenuation mechanism is based on the optical absorption provided by the injected carriers in the intrinsic region which also serves as the waveguiding structure for light to pass through.

The relationship between carrier concentration, phase shift, and optical absorption around an optical wavelength of 1550 nm is given by the empirical Soref and Bennet equations, see Soref et al., and Nedeljkovic et al., "Free-Carrier Electrorefraction and Electroabsorption Modulation Predictions for Silicon Over the 1-14-um Infrared Wavelength Range." IEEE Photonics Journal 3.6 (2011):1171-1180, the contents of which are incorporated by reference:

$$\Delta\alpha = 8.88 \times 10^{-21} \Delta N_e^{1.167} + 5.84 \times 10^{-20} \Delta N_h^{1.109},$$

$$\Delta n = 5.40 \times 10^{-22} \Delta N_e^{1.011} + 1.53 \times 10^{-18} \Delta N_h^{0.838},$$

where $\Delta\alpha$ is an additional material absorption, $\Delta n$ is a shift to the refractive index of silicon, and $\Delta N_e$, and $\Delta N_h$ are the free electron and hole concentrations, respectively. A change to absorption, to perform the VOA functionality, implies a change to the optical phase through a change in the refractive index of the light guiding material. This is also measured experimentally, as previously shown in FIGS. 2A-2D.

Figure 2A:
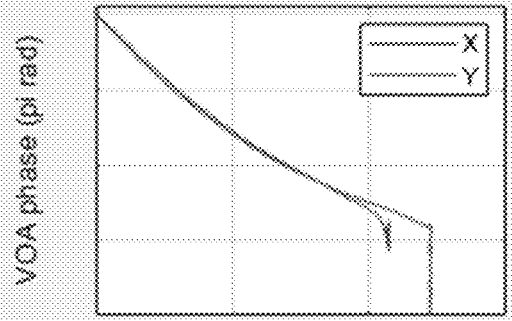
FIGS. 2A-2D are graphs of characteristics of a typical VOA using a p-i-n junction in carrier injection mode (forward voltage operation).
Figure 2B:
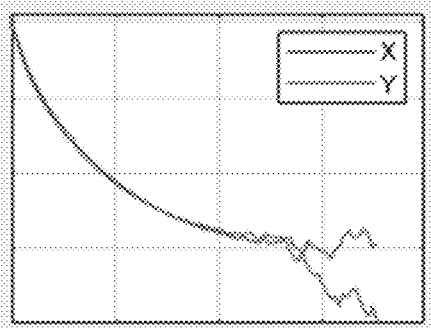
Figure 2C:
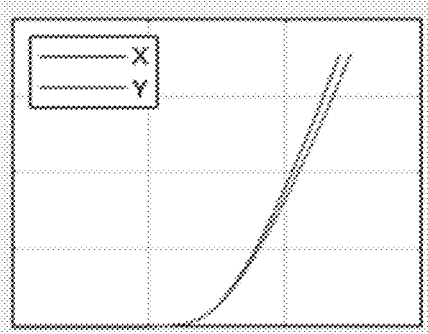
Figure 2D:
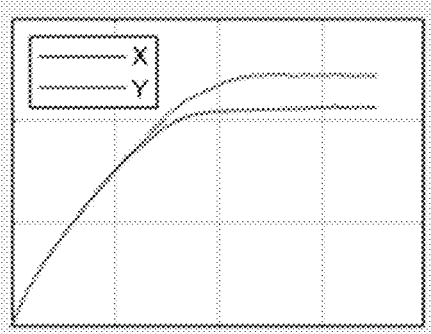

It is worth noting that the diminishing return in attenuation for increasing phase shifts that is predicted by the theoretical equations is also seen experimentally (FIG. 2A). It is possible to reduce to some extent the large phase shift induced for a specific attenuation target by making the VOA longer. This has obvious drawbacks however with regard to integration and optical insertion losses (IL) of longer waveguides in the larger structure.

Figure 10:
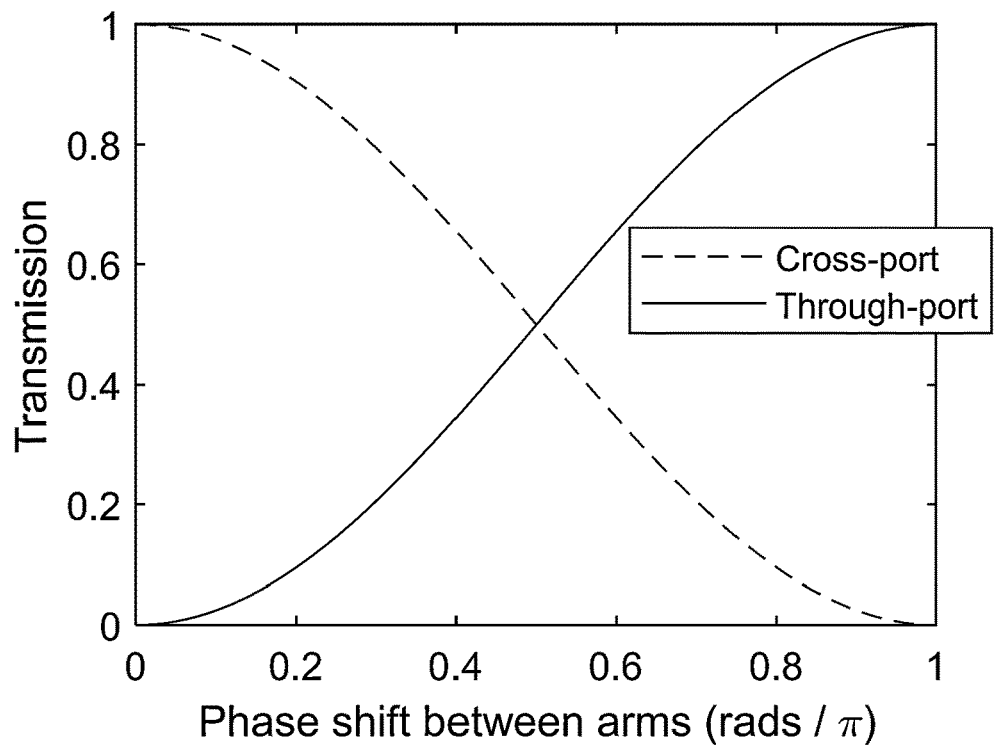
FIGS. 10 and 11 are graphs illustrating the relationship between phase and amplitude for a balanced MZI with ideal 3 dB couplers.
Figure 11:
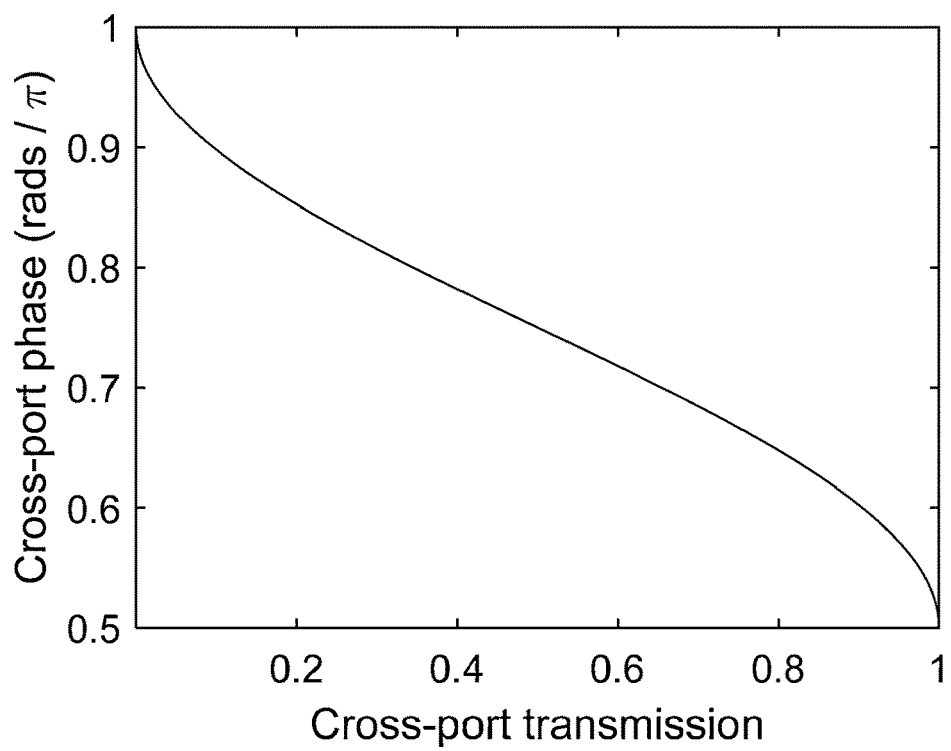

With the physical reality that a current-injection VOA will always generate a phase shift, it is possible to take advantage of this fact by embedding this current-injection VOA into an interferometric system, the simplest of which being the Mach-Zehnder interferometer (MZI). The relationship between phase and amplitude for a balanced MZI with ideal 3 dB couplers is shown in FIGS. 10 and 11. The phase shift is applied to a single arm of the MZI.

By inducing a $\pi$ phase shift between the two arms, the cross-port transmission goes from full bright to full attenuation while inducing a maximum of $\pi/2$ phase shift in the output. In practice, this is much less (14-20×) than a regular p-i-n VOA maintained at reasonable lengths (≤1 mm). A resonant system (e.g., a ring resonator containing a phase shifter) would still require the same overall $\pi$ phase shift to go from full bright to full attenuation, while also being highly sensitive to the wavelength of operation (thus incompatible with a multi-channel input signal) and much more likely to produce large excess loss.

To maintain a fast-acting VOA, a fast phase shifter is still needed to induce this $\pi$ phase shift. The forward-biased p-i-n is again the preferred implementation in the MZI structure. It is required to remain at a certain length to not induce too large of a parasitic attenuation. For single-ended operation, the additional attenuation in one arm degrades the extinction ratio of the MZI at full attenuation—for an extinction ratio defined as the ratio of the maximum to minimum transmission on the same port (e.g., cross).

Differential operation of the high-speed phase shifters would allow a net zero phase shift in the output signal but would require operating the dual phase shifters at a midpoint, where they would induce a higher base insertion loss at maximum transmission.

Secondary Phase Shifters in Each Arm

Figure 12:
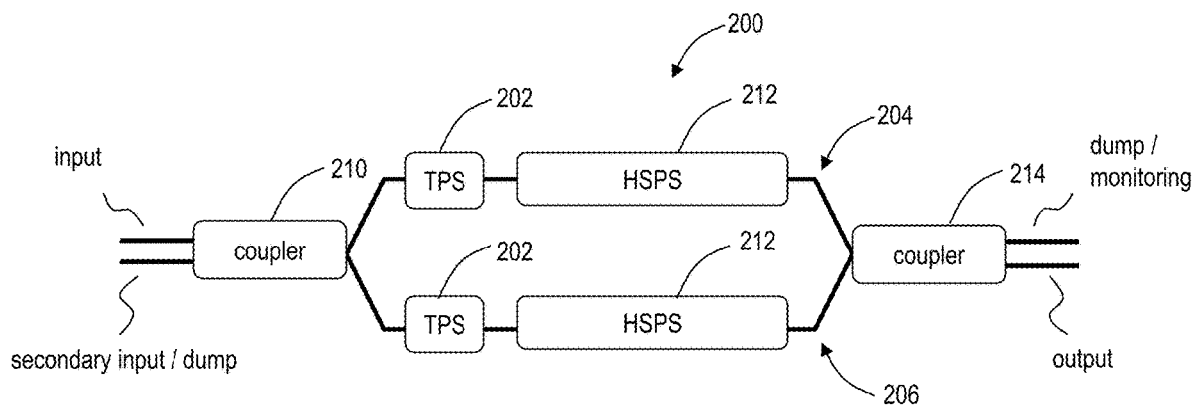
FIG. 12 is a block diagram of an MZI VOA with secondary phase shifters in each arm, where the secondary phase shifters are separate.
Figure 13:
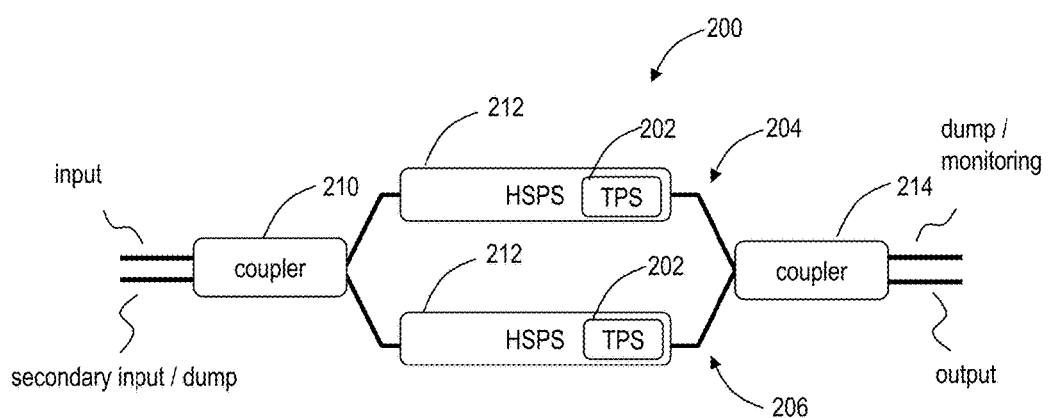
FIG. 13 is a block diagram of an MZI VOA with the secondary phase shifters in each arm, where the secondary phase shifters overlaid.

FIG. 12 is a block diagram of an MZI VOA 200 with secondary phase shifters 202 in each arm 204, 206, where the secondary phase shifters 202 are separate. FIG. 13 is a block diagram of the MZI VOA 200 with the secondary phase shifters 202 in each arm 204, 206, where the secondary phase shifters 202 are overlaid. The MZI VOA 200 includes a coupler 210 that splits an input into each of the arms 204, 206. In FIG. 12, the MZI VOA 200 includes the secondary phase shifters 202 separate from a high-speed phase shifter (HSPS) 212. In FIG. 13, the MZI VOA 200 includes the secondary phase shifters 202 overlaid on the high-speed phase shifter 212. The secondary phase shifters 202 can be thermal phase shifters (TPS). The high-speed phase shifter 212 can be a p-i-n structure. The two arms 204, 206 are combined by a coupler 214 that provides an output.

It is advantageous to introduce the secondary phase shifters 202 in each arm 204, 206 that can operate at a slower speed but do not induce any (significant) attenuation for an induced phase shift. This allows properly biasing the MZI VOA 200 at a transmission maximum when the high-speed phase shifters 212 are not operated. A fabricated device will have an initially random phase difference between the two arms 204, 206, due to fabrication imperfections, that can be compensated by such secondary phase shifters 202. The common mechanism to exploit for making such phase shifters 202 in a silicon photonics platform is the thermo-optic effect, by applying heat locally to waveguides. Another mechanism is the use of micro-electromechanical actuators, such as described in Edinger, et al. "Silicon photonic micro-electromechanical phase shifters for scalable programmable photonics." *Opt. Lett.* 46.22 (2021):5671-5674, the contents of which are incorporated by reference.

The couplers 210, 214 in FIGS. 12 and 12 are shown as a 2×2 coupler but can also be a three-port device, i.e., without the secondary input or the dump/monitoring port. The splitting ratio is typically as close as possible to 3 dB to maximize the extinction ratio. A silicon photonics implementation of such a coupler 210, 214 can be a multimode interference (MMI) coupler, a directional coupler, an adiabatic coupler, or any other compact device achieving such a functionality.

Other Arrangements Combining High-Speed p-i-n Phase Shifters with Thermal Phase Shifters The following describes various other arrangements combining high-speed p-i-n phase shifters with thermal phase shifters (TPS) in a MZ architecture.

Figure 15:
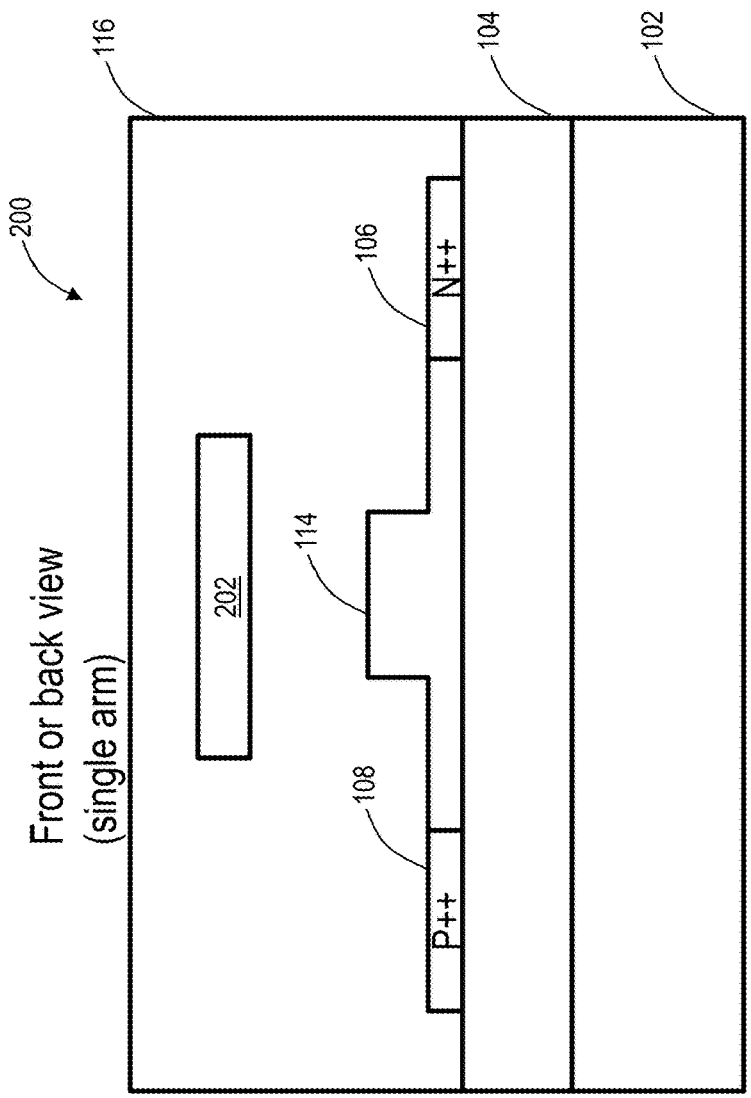
FIGS. 14 and 15 are diagrams of a single arm of the MZI VOA with a top view (FIG. 14) and side view (FIG. 15) in the embodiment where the secondary phase shifters are separate from the high-speed phase shifters.
Figure 14:
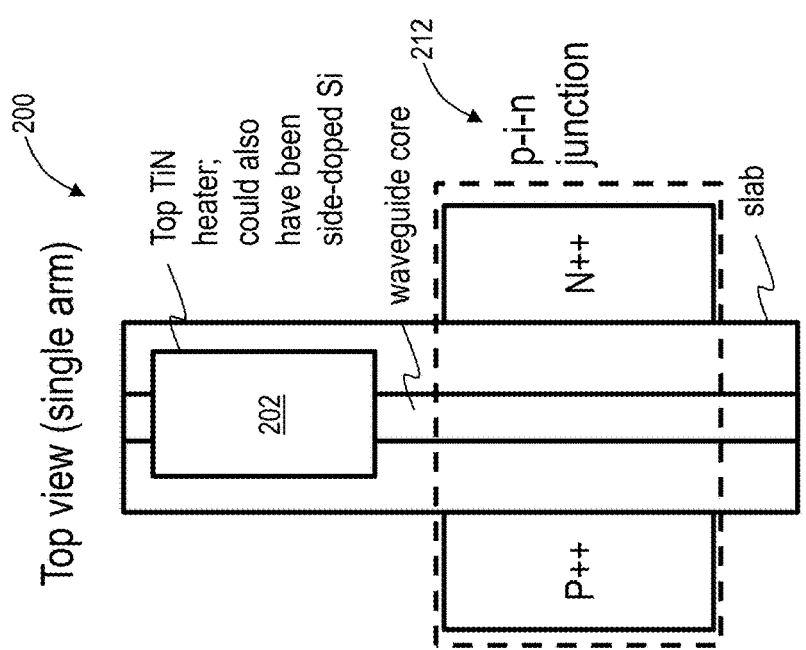

FIGS. 14 and 15 are diagrams of a single arm 204, 206 of the MZI VOA 200 with a top view (FIG. 14) and side view (FIG. 15) in the embodiment where the secondary phase shifters 202 are separate from the high-speed phase shifters 212. The secondary phase shifters 202 can be titanium nitride (TiN) as well as be making use of resistive doped silicon on the sides of the optical waveguide. Deep trenches can be etched to increase power efficiency by increasing thermal isolation to the environment and thus increasing the amount of heat trapped around the waveguides.

Figure 17:
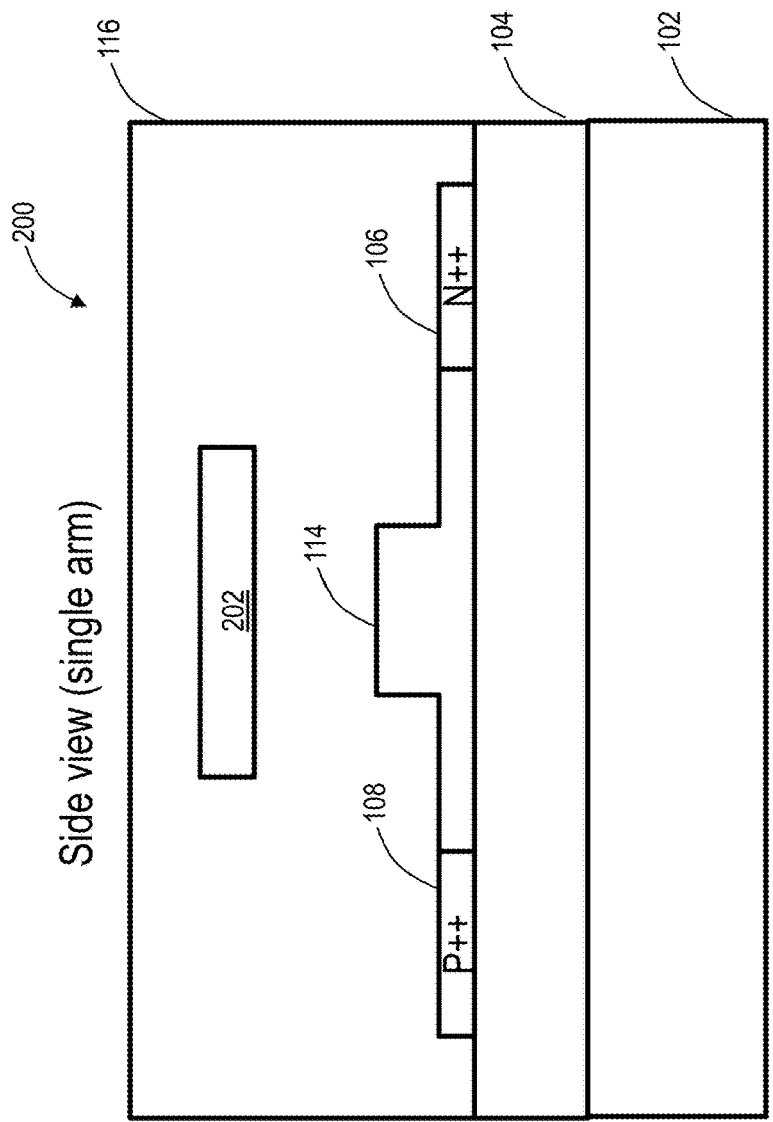
FIGS. 16 and 17 are diagrams of a single arm of the MZI VOA with a top view (FIG. 14) and cross-section view (FIG. 15) in the embodiment where the secondary phase shifters are overlaid on the high-speed phase shifters.
Figure 16:
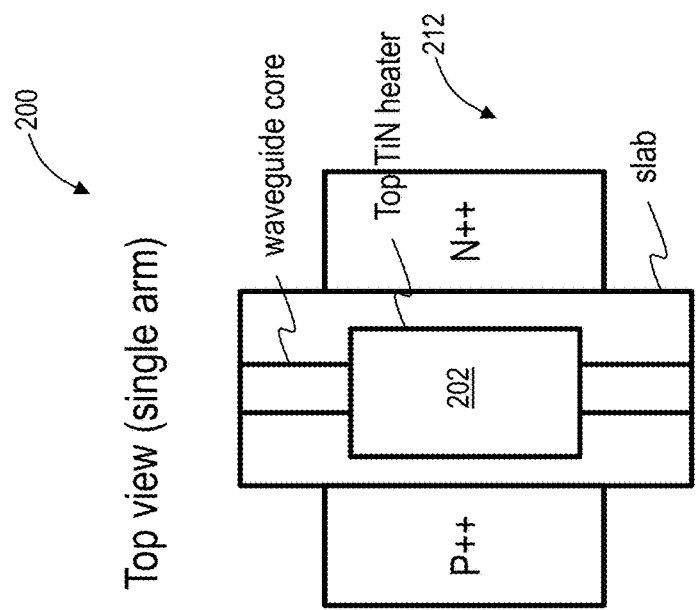

FIGS. 16 and 17 are diagrams of a single arm 204, 206 of the MZI VOA 200 with a top view (FIG. 14) and cross-section view (FIG. 15) in the embodiment where the secondary phase shifters 202 are overlaid on the high-speed phase shifters 212. Here, the TiN TPS is put on top of the p-i-n junction directly. This saves on space (and IL), but does heat the junction during operation, which must be taken into account in the control loops.

Figure 18:
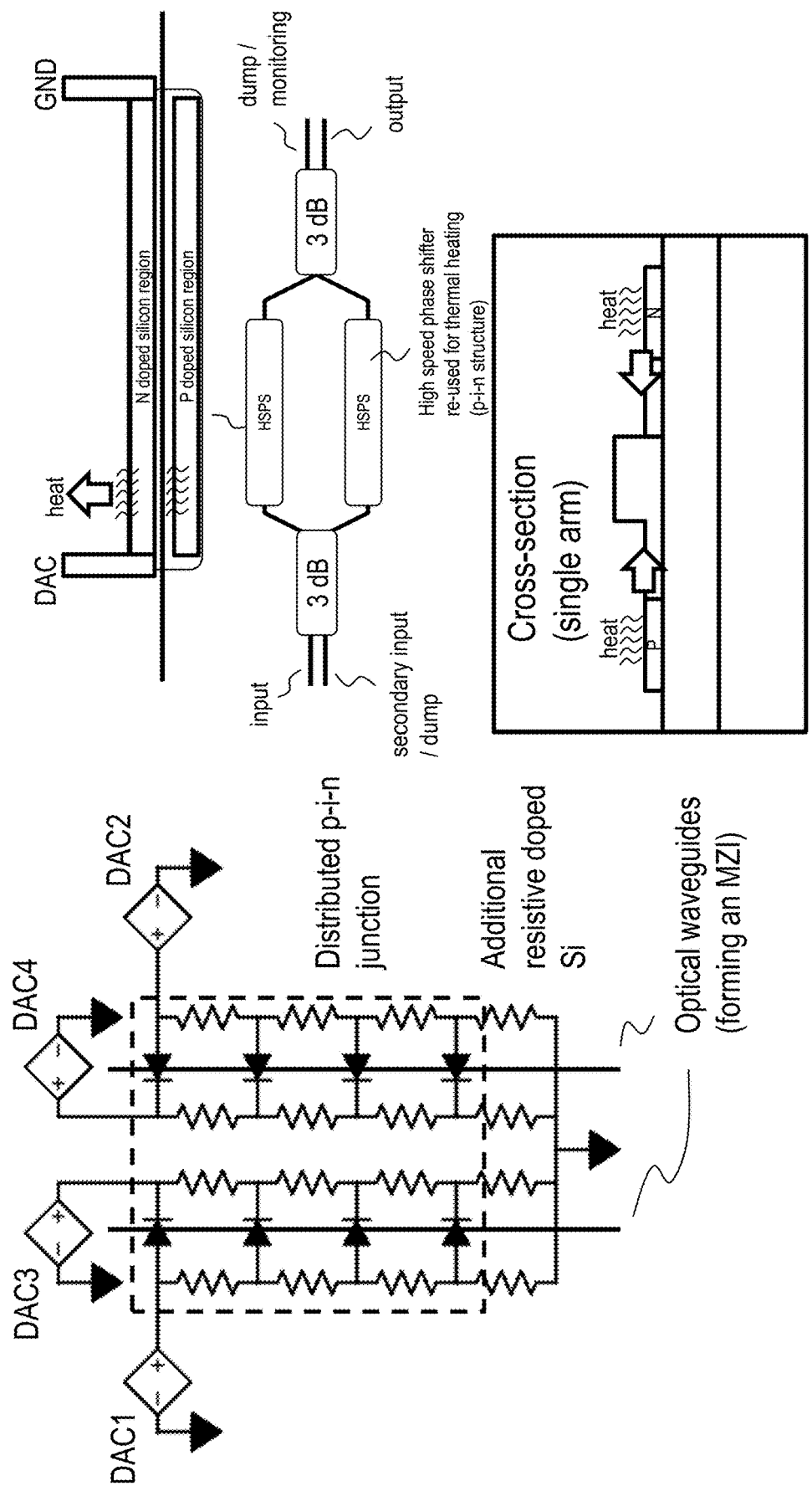
FIG. 18 shows diagrams of an embodiment of a single arm of the MZI VOA with combined p-i-n and resistive heater (electrical connections).

FIG. 18 shows diagrams of an embodiment of a single arm 204, 206 of the MZI VOA 200 with combined p-i-n and resistive heater (electrical connections). The side doped sections (p++ and n++) forming the p-i-n junctions are re-used as resistive heaters. The resistive part can extend past the p-i-n section. The junction and heater controls are now interlinked, adding complexity to the control loops, but simplifying the silicon photonics implementation. The resistor values are to be carefully engineered by playing with dopant levels (e.g., using a plurality) and form factors (affecting sheet resistance values). The resistor values need not be all identical.

Figure 19:
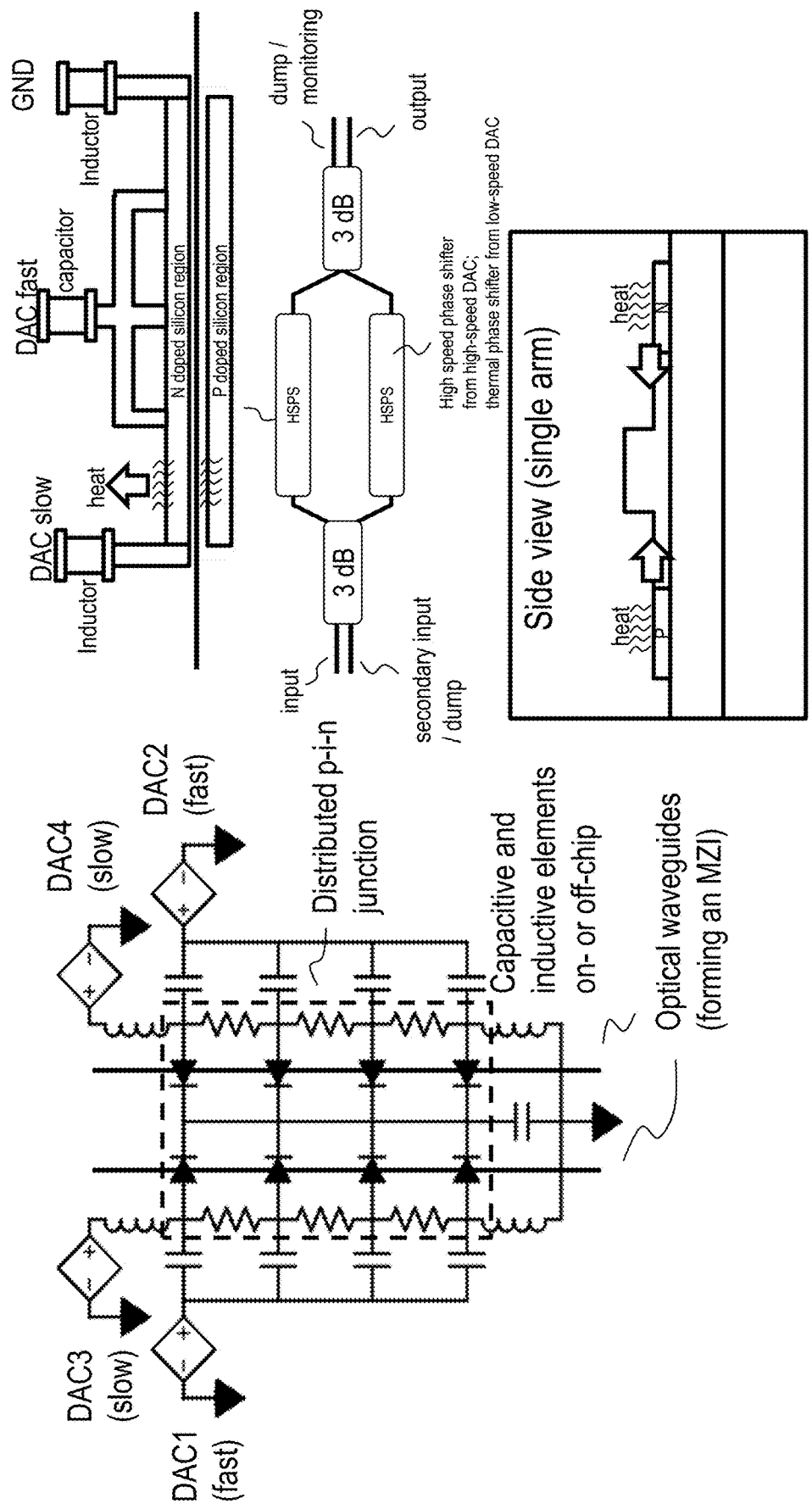
FIG. 19 shows diagrams of an embodiment of a single arm of the MZI VOA with combined p-i-n and resistive heater (with AC/DC decoupling).

FIG. 19 shows diagrams of an embodiment of a single arm 204, 206 of the MZI VOA 200 with combined p-i-n and resistive heater (with AC/DC decoupling). The side doped sections are also used as resistive heaters, but the low- and high-speed phase shifters are decoupled. An AC signal operates the high-speed junctions. This is because the high-speed junctions are most useful for the compensation of fast line perturbations, as explained above, which can be decomposed into their Fourier components and compensated with an AC signal. The low-speed TPS 202 is limited to frequencies around DC but can otherwise actuate the phase and thus change the state of the MZI independently of the AC signal. For fast compensation of a static perturbation, the two signals are combined, with the slower signal taking over after the RC decay of the fast one. It is also conceivable to imagine other AC/DC schemes where the two are not fully decoupled.

More broadly, the P-I-N and resistive parts can be combined directly (FIG. 18) or segmented (FIG. 19). The current-injected p-i-n junctions combine resistive elements for thermo-optic actuation. This can include segmentation and AC/DC decoupling. This is done to address the requirements of a low phase change VOA in a coherent receiver 10.

The MZI VOA 200 describes a chirp-free Mach-Zehnder interferometer that includes
(1) p-i-n junction phase shifter (Current-Injection VOA) for fast phase control, and
(2) Thermal phase shifter (TPS) for slow phase control.
The combination of both structures realizes a VOA with low phase excursion and low insertion losses at the fully 'bright' setting.

Combination

The VOAs 12, 42 in the coherent optical receiver 10 can utilize the MZI VOA 200. Again, the coherent optical receiver 10 includes the VOA 42 that when actuated generates a very low [SIG×LO] phase perturbation.

The coherent receiver 10 with low [SIG×LO] phase perturbation from VOA actuation can be realized with
(1) SIG and LO tandem VOA (VOA on SIG path and LO path)
(2) CI-VOA on SIG path and CI-VOA on LO path
(3) Chirped MZ-VOA on SIG path and CI-VOA on LO path. The chirped MZ VOA is a single end drive on either upper or lower MZ arm
(4) Chirped MZ-VOA on SIG path and Chirped MZ-VOA on LO path
(5) CI-VOA on SIG path and Chirped MZ-VOA on LO path The important point of both approaches is generating phase actuation on both SIG path and LO path such that the [SIG×LO] phase perturbation due to the VOAs approaches zero.
(6) Zero chirp MZ VOA 200 (VOA on SIG path only) This MZ VOA is differentially-driven on upper and lower MZ arms.

In an embodiment, a coherent receiver includes a receive signal (SIG) path including i) an input configured to connect a receive signal, ii) one or more signal paths connected to the input and to one or more optical hybrids, and iii) at least one variable optical attenuator (VOA); a local oscillator (LO) signal path including an input configured to connect to an LO and the one or more optical hybrids; and a VOA-induced phase change compensation mechanism that reduces any VOA-induced phase change in a SIG-LO beat signal due to the at least one VOA. Of note, the at least one VOA is optically integrated in the coherent receiver, and the VOA-induced phase change compensation mechanism is configured to remove or reduce any VOA-induced phase change in a SIG-LO beat signal.

In an embodiment, the VOA-induced phase change compensation mechanism includes at least one tandem VOA in the LO path. The at least one VOA and the at least one tandem VOA can each be a same type of VOA or each be a different type of VOA. The at least one VOA and the at least one tandem VOA can each be any of a current injection VOA (CI-VOA) and a chirped Mach-Zehnder (MZ) interferometer (MZI) VOA (MZI-VOA). The at least one VOA and the at least one tandem VOA can each be controlled with a same control signal. The at least one VOA and the at least one tandem VOA can also each be controlled with independent control signals. The at least one VOA and the at least one tandem VOA can each include different phase versus attenuation characteristics, which is compensated therefor. The at least one VOA and the at least one tandem VOA can each have their attenuation set based to provide a same amplitude of a corresponding beat signal. As described herein, a "tandem" VOA is one that is the same (e.g., same part number), similar, different but configured to operate substantially similar, and the like.

In another embodiment, the one or more signal paths include two signal paths, one for an X-polarization and one for a Y-polarization, wherein the VOA in each of the one or more signal paths include a VOA(X) and a VOA(Y). The VOA-induced phase change compensation mechanism can include at least one tandem VOA in the LO path. The at least one tandem VOA can include two VOAs including a LO VOA(X) and a LO VOA(Y) in the LO signal path.

In a further embodiment, the VOA-induced phase change compensation mechanism includes the at least one VOA being a chirp-free Mach-Zehnder (MZ) interferometer. The chirp-free Mach-Zehnder (MZ) interferometer can include a p-i-n junction phase shifter for fast phase control, and a thermal phase shifter (TPS) for slow phase control.

Figure 20:
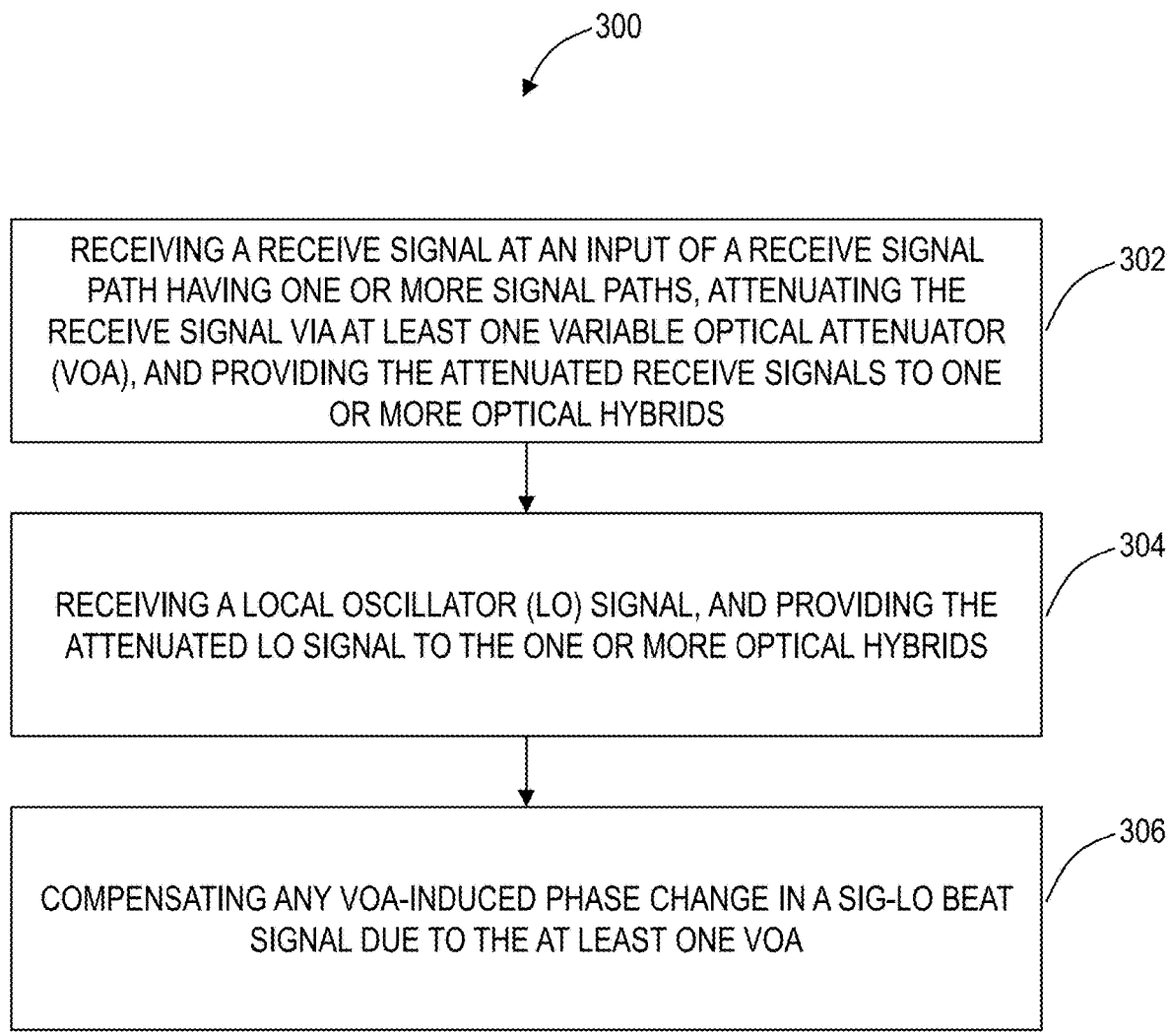
FIG. 20 is a flowchart of a process for a coherent receiver having low variable optical attenuator (VOA)-induced phase changes.

FIG. 20 is a flowchart of a process 300 for a coherent receiver having low variable optical attenuator (VOA)-induced phase changes. The process 300 includes receiving a receive signal at an input of a receive signal path having one or more signal paths, attenuating the receive signal via at least one variable optical attenuator (VOA), and providing the attenuated receive signals to one or more optical hybrids (step 302); receiving a local oscillator (LO) signal, and providing the attenuated LO signal to the one or more optical hybrids (step 304); and compensating any VOA-induced phase change in a SIG-LO beat signal due to the at least one VOA (step 306). The compensating can include (1) tandem VOAs for attenuating the LO signal such that the LO signal experiences similar VOA-induced phase change as the attenuated receive signals, or (2) utilizing a chirp-free Mach-Zehnder (MZ) interferometer for the attenuating.

Experimental Results

VOA induced phase change can be provides in units of $$\frac{\text{rad}_{RMS}}{sec} \text{ or } \frac{\text{rad}_{Peak}}{sec},$$

and these can be related, e.g., $$\frac{\text{rad}_{Peak}}{sec}$$

can be 2-4 times larger than $$\frac{\text{rad}_{RMS}}{sec}.$$

As known in the art, RMS is root mean square (RMS), RAD is radians, etc. The approach described herein in FIG. 1, i.e., VOA only on the SIG path and not the LO path, can have a VOA induced phase change on the order of hundreds of thousands of these values, and this can be beyond the ability of a coherent DSP to track. The chirp Mach-Zehnder (MZ) interferometer on the SIG path described herein can have a VOA induced phase change on the order of tens of thousands of these values, a significant improvement from the CI-VOA only on the SIG path, and typically well within the ability of a coherent DSP to track. The tandem VOA approach, i.e., VOA on both the SIG path and the LO path, and the chirp-free MZ on the SIG path approach can have a VOA induced phase change on the order of thousands of these values.

Although a chirped MZ on the SIG path only is within tens of thousands of rad/sec phase change, it is undesirable to use the DSP phase change capability when the Rx is tracking optical input power transients as well. When an optical transient appears, there will be associated SOP phase rotation as well. The advantage of the tandem VOA and the chirp-free MZ approach described herein includes having the VOA induced phase change as low as possible so that most of the phase change tracking budget in the DSP is allocated for any optical line perturbations.

Conclusion

It will be appreciated that some embodiments described herein may include or utilize one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field-Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application-Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured to," "logic configured to," etc. perform a set of operations, steps, methods, processes, algorithms, functions, techniques, etc. on digital and/or analog signals as described herein for the various embodiments.

Moreover, some embodiments may include a non-transitory computer-readable medium having instructions stored thereon for programming a computer, server, appliance, device, at least one processor, circuit/circuitry, etc. to perform functions as described and claimed herein. Examples of such non-transitory computer-readable medium include, but are not limited to, a hard disk, an optical storage device, a magnetic storage device, a Read-Only Memory (ROM), a Programmable ROM (PROM), an Erasable PROM (EPROM), an Electrically EPROM (EEPROM), Flash memory, and the like. When stored in the non-transitory computer-readable medium, software can include instructions executable by one or more processors (e.g., any type of programmable circuitry or logic) that, in response to such execution, cause the one or more processors to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims. Moreover, it is noted that the various elements, operations, steps, methods, processes, algorithms, functions, techniques, etc. described herein can be used in any and all combinations with each other.

What is claimed is:

1. A coherent receiver comprising:
   a receive signal (SIG) path including i) an input configured to connect a receive signal, ii) one or more signal paths connected to the input and to one or more optical hybrids, and iii) at least one first variable optical attenuator (VOA); and
   a local oscillator (LO) signal path including an input configured to connect to an LO and the one or more optical hybrids;
   wherein the optical receiver includes a VOA-induced phase change compensation mechanism that reduces any VOA-induced phase change in a SIG-LO beat signal due to the at least one first VOA being in the signal path, wherein the VOA-induced phase change compensation mechanism includes one or more of (i) an at least one tandem second VOA in the LO path before the one or more optical hybrids, the at least one second VOA configured to add a LO phase change to the LO path to at least partially compensate for the VOA-induced phase change in the signal path due to the at least one first VOA, and (ii) the at least one first VOA being a chirp-free Mach-Zehnder interferometer forming the at least one first VOA in the signal path.

2. The coherent receiver of claim 1, wherein the at least one first VOA and the at least one tandem second VOA are each a same type and part number of VOA.

3. The coherent receiver of claim 1, wherein the at least one first VOA and the at least one tandem second VOA are each a different type of VOA.

4. The coherent receiver of claim 1, wherein the at least one first VOA and the at least one tandem second VOA are each any of a current injection VOA (CI-VOA) embedded into a chirped Mach-Zehnder (MZ) interferometer (MZI) VOA (MZI-VOA).

5. The coherent receiver of claim 1, wherein the at least one first VOA and the at least one tandem second VOA are each controlled with a same control signal.

6. The coherent receiver of claim 1, wherein the at least one first VOA and the at least one tandem second VOA are each controlled with independent control signals.

7. The coherent receiver of claim 1, wherein the at least one first VOA and the at least one tandem second VOA each include different phase versus attenuation characteristics, which are configured appropriately.

8. The coherent receiver of claim 1, wherein the at least one first VOA and the at least one tandem second VOA each have their attenuation set based to provide a same amplitude of a corresponding beat signal.

9. The coherent receiver of claim 1, wherein the one or more signal paths include two signal paths, one for an X-polarization and one for a Y-polarization, wherein the VOA in each of the one or more signal paths include a VOA (X) and a VOA (Y).

10. The coherent receiver of claim 9, wherein the VOA-induced phase change compensation mechanism includes at least one tandem VOA in the LO signal path.

11. The coherent receiver of claim 10, wherein the at least one tandem second VOA includes two VOAs including a LO VOA (X) and a LO VOA (Y) in the LO signal path.

12. The coherent receiver of claim 1, wherein the VOA-induced phase change compensation mechanism includes the at least one VOA being a chirp-free Mach-Zehnder (MZ) interferometer.

13. The coherent receiver of claim 12, wherein the chirp-free Mach-Zehnder (MZ) interferometer includes
   a p-i-n junction phase shifter for fast phase control, and
   a thermal phase shifter (TPS) for slow phase control.

14. The coherent receiver of claim 1, wherein the VOA-induced phase change compensation mechanism reduces the VOA-induced phase change to within thousands or less of
   radRMSsecradRMSsec
   and
   radPeaksec.

15. The coherent receiver of claim 1, wherein the VOA-induced phase change compensation mechanism includes the at least one second VOA in the LO path before the one or more optical hybrids.

16. A coherent receiver formed by a process comprising steps of:
   forming a receive signal (SIG) path including i) an input configured to connect a receive signal, ii) one or more signal paths connected to the input and to one or more optical hybrids, and iii) at least one variable optical attenuator (VOA);
   forming a local oscillator (LO) signal path including an input configured to connect to an LO and the one or more optical hybrids; and
   providing a VOA-induced phase change compensation mechanism that reduces any VOA-induced phase change in a SIG-LO beat signal due to the at least one VOA wherein the VOA-induced phase change compensation mechanism includes one or more of (i) an at least one tandem second VOA in the LO path before the one or more optical hybrids, the at least one second VOA configured to add a LO phase change to the LO path to at least partially compensate for the VOA-induced phase change in the signal path due to the at least one first VOA, and (ii) the at least one first VOA being a chirp-free Mach-Zehnder interferometer forming the at least one first VOA in the signal path.

17. The coherent receiver of claim 16, wherein the VOA-induced phase change compensation mechanism includes at least one tandem VOA in the LO signal path.

18. The coherent receiver of claim 16, wherein the VOA-induced phase change compensation mechanism includes the at least one VOA being a chirp-free Mach-Zehnder (MZ) interferometer.

19. A method comprising steps of:
receiving a receive signal at an input of a receive signal path having one or more signal paths, attenuating the receive signal via at least one first variable optical attenuator (VOA), and providing the attenuated receive signals to one or more optical hybrids;

receiving a local oscillator (LO) signal, and providing an attenuated LO signal to the one or more optical hybrids over a LO path; and compensating any VOA-induced phase change in a receive signal (SIG)-LO beat signal due to the at least one first VOA being in the signal path via at least one second VOA in the LO path before one or more optical hybrids, the (i) at least one second VOA configured to add a LO phase change to the LO path to at least partially compensate for a signal phase change in the signal path due to the at least one first VOA, (ii) and the at least one first VOA being a chirp-free Mach-Zehnder (MZ) interferometer forming the at least one first VOA in the signal path.

20. The method of claim 19, wherein the VOA-induced phase change compensation mechanism reduces the VOA-induced phase change to within thousands or less of
radRMSsecradRMSsec
and
radPeaksec.

* * * * *